(12) United States Patent
Webster et al.

(10) Patent No.: US 9,294,223 B2
(45) Date of Patent: Mar. 22, 2016

(54) RECEPTION OF CO-CHANNEL SIGNALS

(71) Applicant: HARRIS CORPORATION, Melbourne, FL (US)

(72) Inventors: Mark Webster, Indian Harbour Beach, FL (US); R. Keith McPherson, Palm Bay, FL (US); Terry Tabor, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 113 days.

(21) Appl. No.: 14/169,209

(22) Filed: Jan. 31, 2014

(65) Prior Publication Data

US 2015/0222391 A1 Aug. 6, 2015

(51) Int. Cl.
*H04B 7/14* (2006.01)
*H04L 1/00* (2006.01)
*H04L 1/20* (2006.01)

(52) U.S. Cl.
CPC ............. *H04L 1/0048* (2013.01); *H04L 1/005* (2013.01); *H04L 1/0054* (2013.01); *H04L 1/20* (2013.01)

(58) Field of Classification Search
CPC ........ H04L 1/0048; H04L 1/0054; H04L 1/20
USPC .......................................... 370/315, 329, 335
See application file for complete search history.

(56) References Cited

U.S. PATENT DOCUMENTS

| 6,967,598 | B2 | 11/2005 | Mills |
| 7,027,533 | B2 | 4/2006 | Abe et al. |
| 7,092,452 | B2 | 8/2006 | Taylor et al. |
| 7,386,076 | B2 | 6/2008 | Onggosanusi et al. |
| 7,593,492 | B1 | 9/2009 | Lande |
| 8,027,401 | B2 | 9/2011 | Hwang et al. |
| 2004/0047438 | A1* | 3/2004 | Zhuang et al. ............... 375/340 |

OTHER PUBLICATIONS

Purkovic, A., et al., "Turbo Equalization in an LTE Uplink MIMO Receiver," MILCOM 2011, Track 1, Waveforms and Signal Processing, pp. 489-494, 978-1-4673-0081-0/11 ©2011 IEEE.

(Continued)

*Primary Examiner* — Mang Yeung
(74) *Attorney, Agent, or Firm* — Fox Rothschild, LLP; Robert J. Sacco; Carol E. Thorstad-Forsyth

(57) ABSTRACT

System (100) and methods (3500) for receive processing of a burst communication system where co-channel signals (318) collide in a receiver (150). The methods comprise: simultaneously receiving co-channel signals (2002, 2004, 2006) transmitted from remote transmitters (104-112) at a first frequency; and independently performing a first iteration of a Turbo MUD process for a first co-channel signal and a second co-channel signal. The Turbo MUD process comprises: segmenting each of the first and second co-channel signals into a plurality of segments (2102, 2104, 2106) each having a unique SINR; computing a noise plus interference variance estimate for each segment; computing first bit likelihood values for each segment based on the noise variance estimate; computing second bit likelihood values for each segment based on the first bit likelihood values; and using the second bit likelihood values (i.e., soft in soft-out) to generate a first estimate of the first and second co-channel signals.

29 Claims, 29 Drawing Sheets

(56) References Cited

OTHER PUBLICATIONS

Son, H., et al., "A Multi-User MIMO Downlink Receiver and Quantizer Design Based on SINR Optimization," IEEE Transactions on Communications, vol. 60, No. 2, Feb. 2012, 0090-6778/12 ©2012 IEEE.

Gesbert, D., et al., "From Single User to Multiuser Communications: Shifting the MIMO Paradigm," IEEE Signal Processing Magazine, Sep. 2007.

Huang, K., et al., "Performance of Orthogonal Beamforming for SDMA with Limited Feedback," IEEE Transactions on Vehicular Technology, Jan. 2009.

Park, C., et al., "Evolution of Uplink MIMO for LTE-Advanced," IEEE Communications Magazine, Feb. 2011, 0163-6804/11 ©2011 IEEE.

Wang, X., et al., "Iterative (Turbo) Soft Interference Cancellation and Decoding for Coded CDMA," IEEE Transactions on Communications, vol. 47, No. 7, Jul. 1999, 0090-6778/99 ©1999 IEEE.

Luise, M., et al., "Carrier Frequency Recovery in All Digital Modems for Burst-Mode Transmissions," IEEE Trans. on Comm., vol. 43, No. 2/3/4. Feb./Mar./Apr. 1995, 0090-6778/95 ©1995 IEEE.

\* cited by examiner

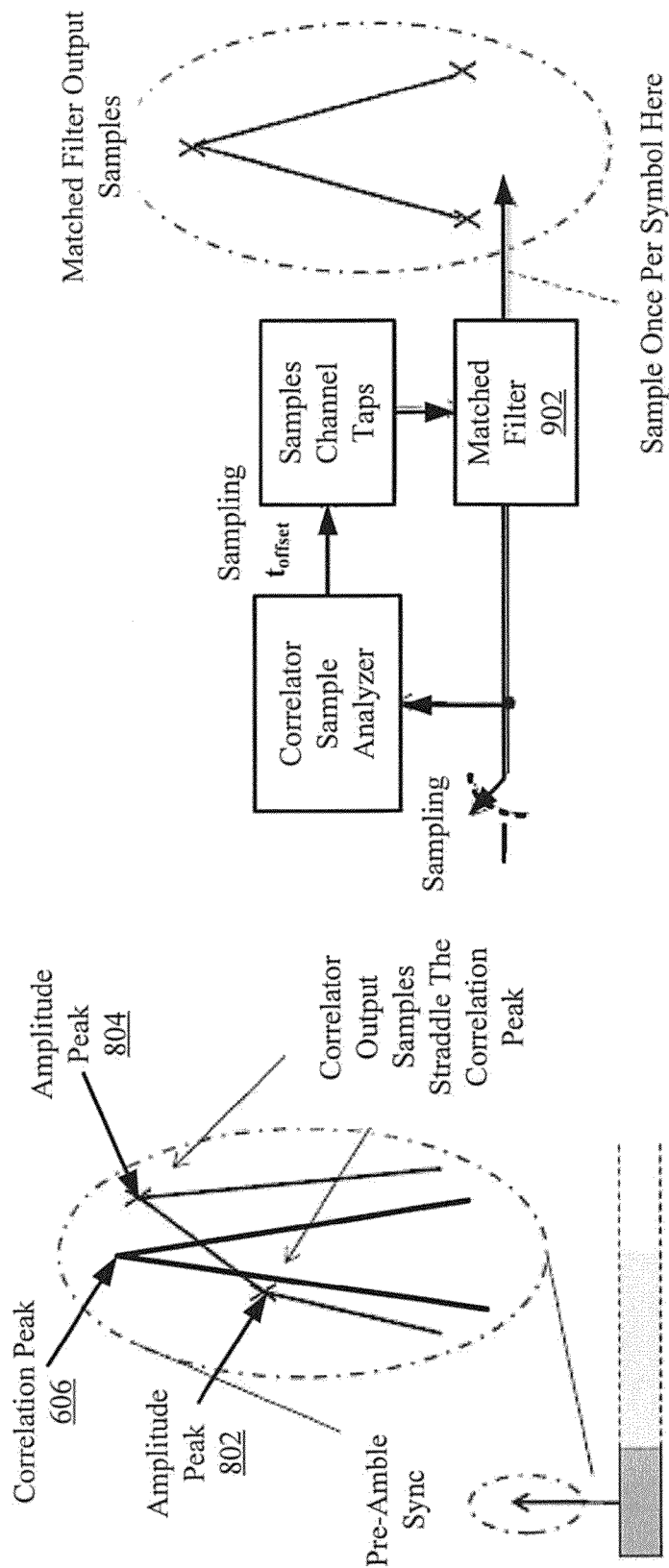

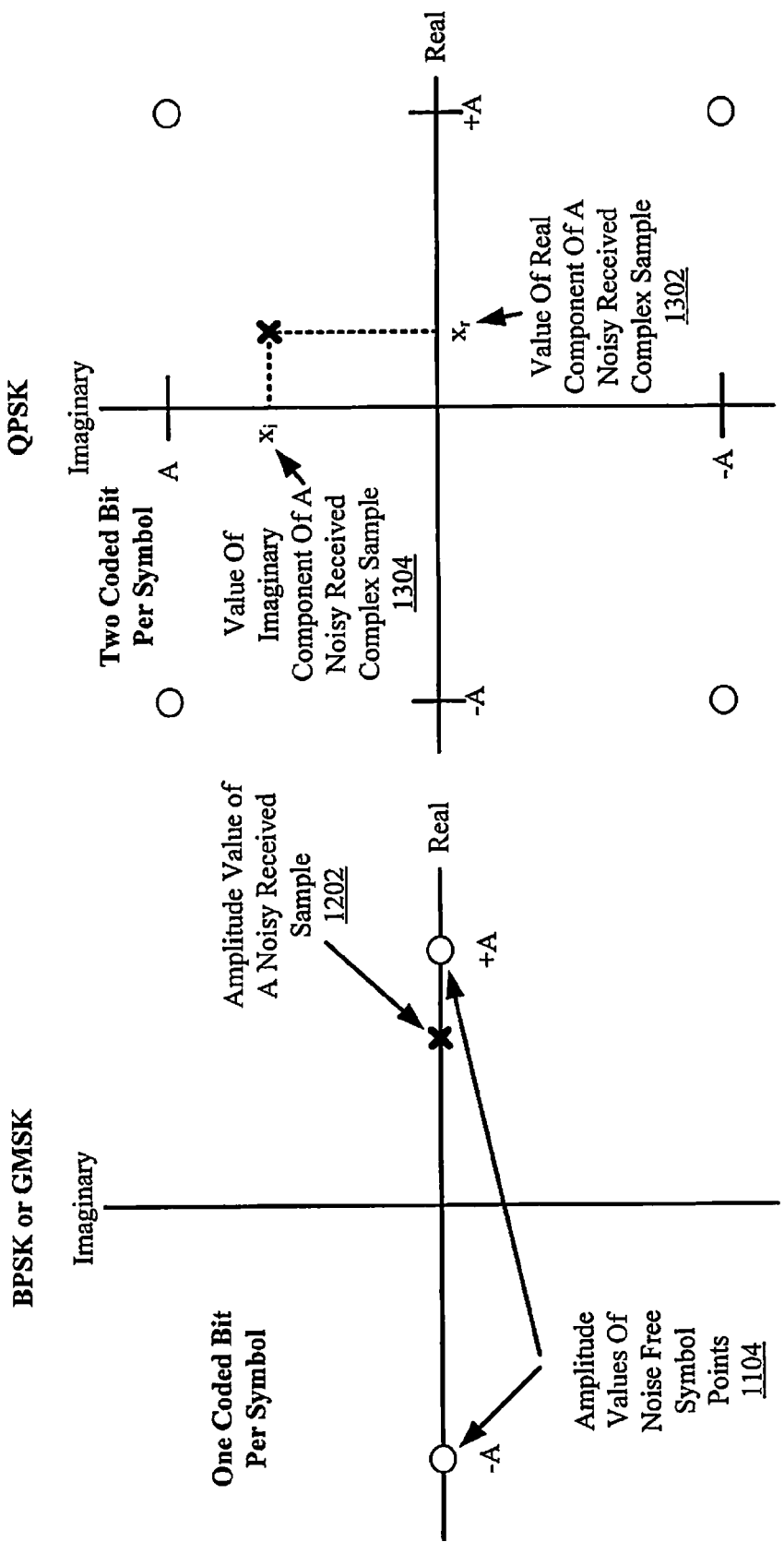

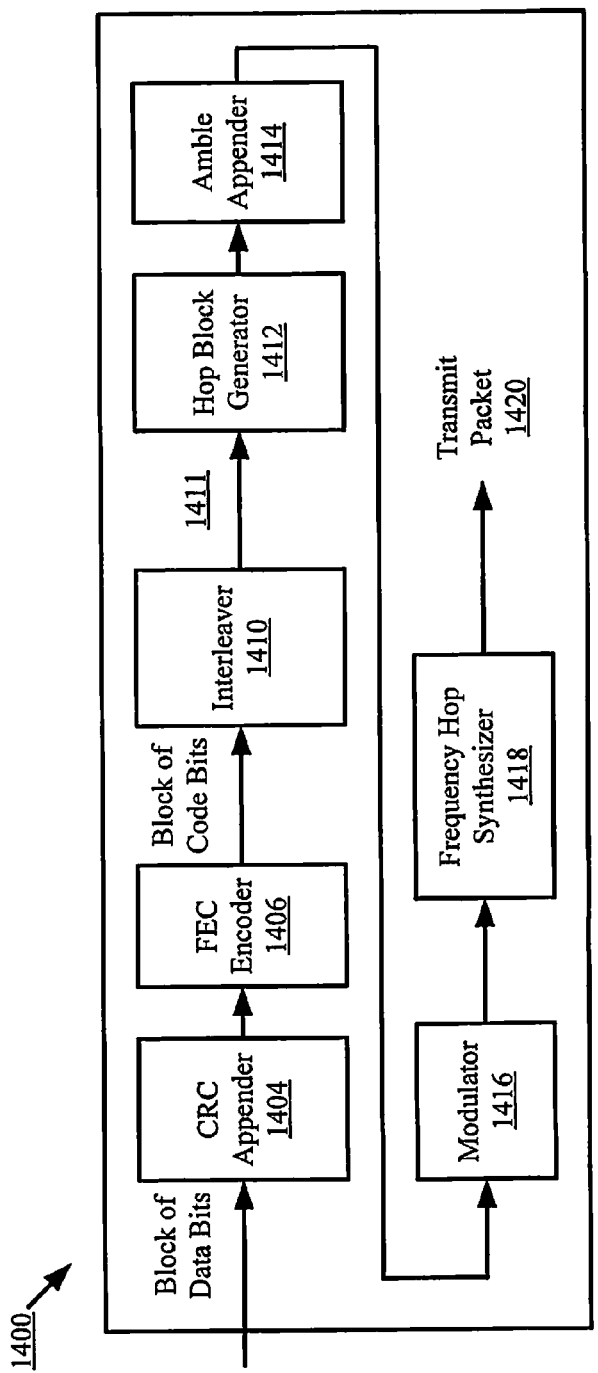
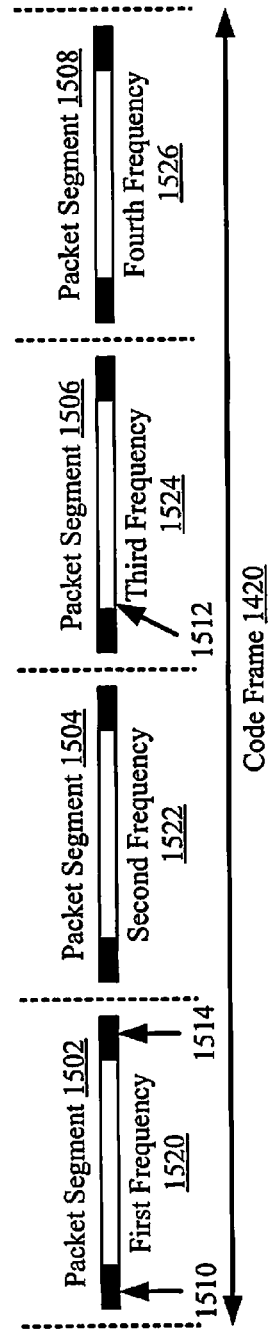
FIG. 14
FIG. 15

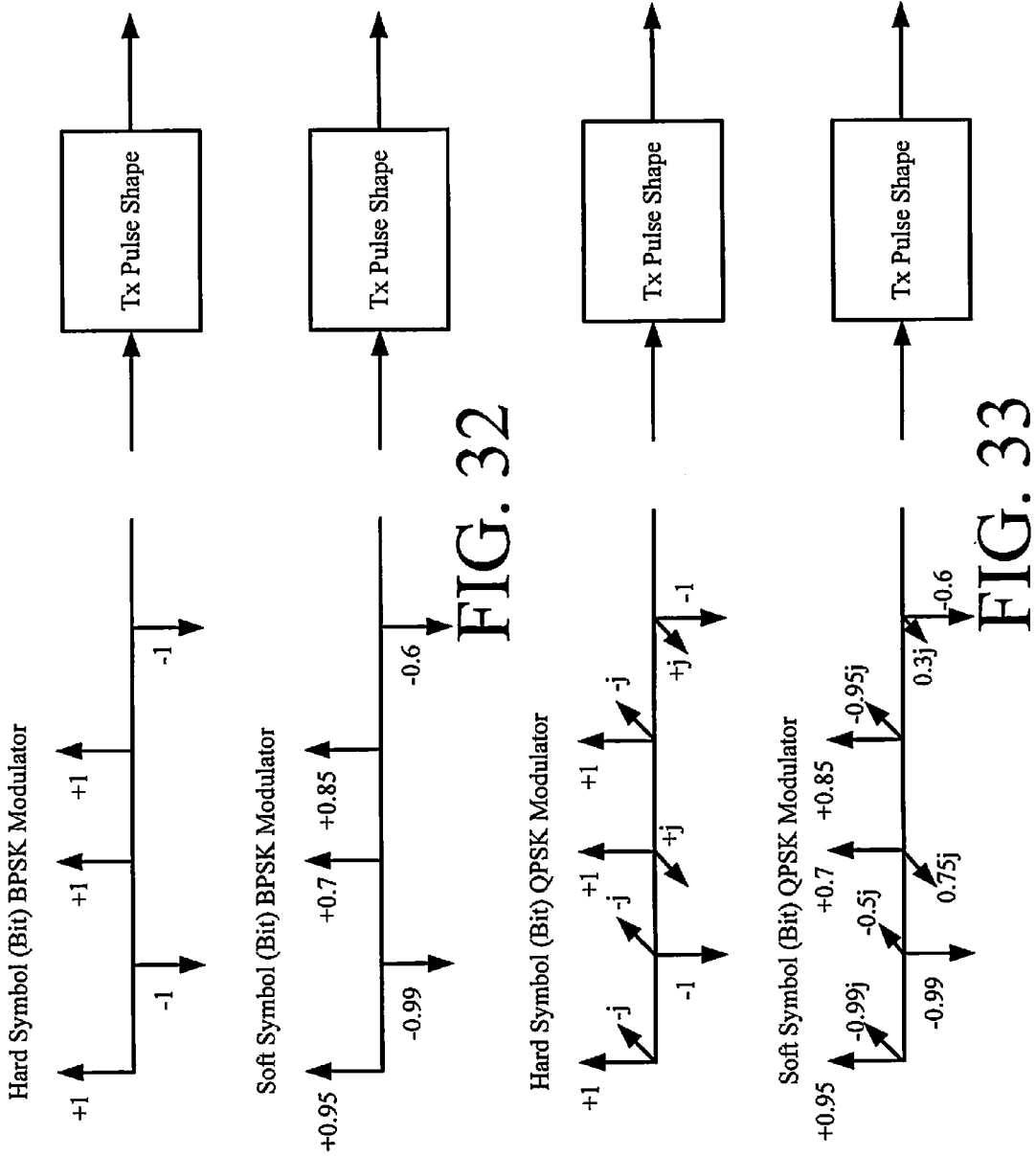

RECEPTION OF CO-CHANNEL SIGNALS

STATEMENT OF THE TECHNICAL FIELD

The inventive arrangements relate to systems and methods for Multi-User Detection ("MUD"). More particularly, the inventive arrangements concern Turbo Single-Input, Single-Output ("SISO") MUD methods for burst communication systems where multiple signals collide in a receiver. In the following, these methods are referred to as Turbo MUD processing, or a Turbo MUD process. The algorithm or device that performs these methods is referred to as a Turbo MUD processor.

DESCRIPTION OF THE RELATED ART

A Single-Input, Single-Output ("SISO") communication system employs a single transmit antenna per user and a single receive antenna for data transmission. A Single-Input, Multiple-Output ("SIMO") communication system employs a single transmit antenna per user and multiple receive antennas for data transmission. A Multi-Input, Multiple-Output ("MIMO") communication system employs multiple transmit antennas per user and multiple receive antennas for data transmission.

MUD refers to a receiver design technology for detecting desired signal(s) from interference and noise. A MUD receiver jointly demodulates co-channel interfering (colliding) signals. In this regard, the MUD receiver may employ a maximum likelihood MUD technique or a Turbo MUD technique. The term "Turbo", as used herein, refers to an iterative process for extracting data from receive samples. Turbo MUD is typically used by a MUD receiver to successfully recover the data of all colliding co-channel signals. In Turbo MUD scenarios, processing is accomplished by ping-ponging between two independent stages separated by an interleaver/de-interleaver to randomize burst error events from each stage. This overall process is referred to herein as Turbo MUD processing, as mentioned earlier.

SUMMARY OF THE INVENTION

The invention concerns implementing systems and methods for receive processing of a burst communication system where a plurality of co-channels signals collide in a receiver. An example three co-channel signal case is considered for sake of explanation where two of the co-channel signals may be of a similar power level and the third may be of a weaker power level such that it cannot be immediately discovered. The present invention supports more general cases. The co-channel signals are transmitted from a plurality of remote transmitters at a first frequency. The methods involve simultaneously receiving at least a portion of the co-channel signals; detecting each of a first co-channel signal and a second co-channel signal by correlating a pre-amble and a post-amble thereof; and independently performing a first iteration of a Turbo MUD process for a first co-channel signal and a second co-channel signal. In some scenarios, the pre-amble and post-amble of each first and second co-channel signal are used to estimate at least one of an amplitude, a carrier phase, a frequency offset, and a fine timing offset. One or more of the listed parameters can be used in the Turbo MUD process.

The Turbo MUD process involves: segmenting each of the first and second co-channel signals into a plurality of segments having unique Signal to Interference plus Noise Ratios; computing a noise variance estimate for each segment; computing first bit likelihood values for each segment based on the noise variance estimate; computing second bit likelihood values for each segment based on the first bit likelihood values (i.e., soft-in soft-out); and using the second bit likelihood values to generate a first estimate of the first and second co-channel signals. The first estimate can include a soft signal estimate without gain and carrier phase adjustments.

Notably, during each iteration of the Turbo MUD process a matched filter is designed for each of the first and second co-channel signals using the estimate of the fine timing offset, respectively. Also, during a second iteration of the Turbo MUD process, best estimates of the first and second co-channel signals are subtracted from a combined co-channel signal such that a third co-channel signal can be detected which has a signal power weaker than a signal power of the first and second co-channel signals. Thereafter, Turbo MUD processing is independently performed for the third co-channel signal. Additionally, prior to the second iteration of the Turbo MUD process for the first co-channel signal, interference caused by the second co-channel signal to the first co-channel signal is canceled. Similarly, prior to the second iteration of the Turbo MUD process for the second co-channel signal, interference caused by the first co-channel signal to the second co-channel signal is canceled.

The Turbo MUD process further involves: using the first estimate to jointly estimate an amplitude and a carrier phase of the first and second co-channel signals; modifying the first estimate to produce a second estimate with the jointly estimated amplitude and carrier phase; and using the second estimate in a subsequent iteration of the Turbo MUD process for amble correlation and interference cancellation.

BRIEF DESCRIPTION OF THE DRAWINGS

Embodiments will be described with reference to the following drawing figures, in which like numerals represent like items throughout the figures, and in which:

FIGS. 8-9 provide schematic illustrations that are useful for understanding how a time offset of a waveform is estimated by a receiver using a pre-amble and post-amble.

FIG. 12 is a graph showing that received signals are detected on a real axis for modulation techniques in which there is one coded bit per symbol.

FIG. 13 is a graph showing that received signals are detected on an imaginary axis and a real axis for modulation techniques in which there are two coded bits per symbol.

FIG. 14 is a block diagram of an exemplary transmitter employing frequency hop technology.

FIG. 15 is a schematic illustration of an exemplary code frame (i.e., transmit packet) output from the transmitter of FIG. 14.

FIGS. 32-33 provide schematic illustrations that are useful for understanding how soft symbols (bits) can be used for soft modulation of a single reconstructor.

DETAILED DESCRIPTION

Figure 1:
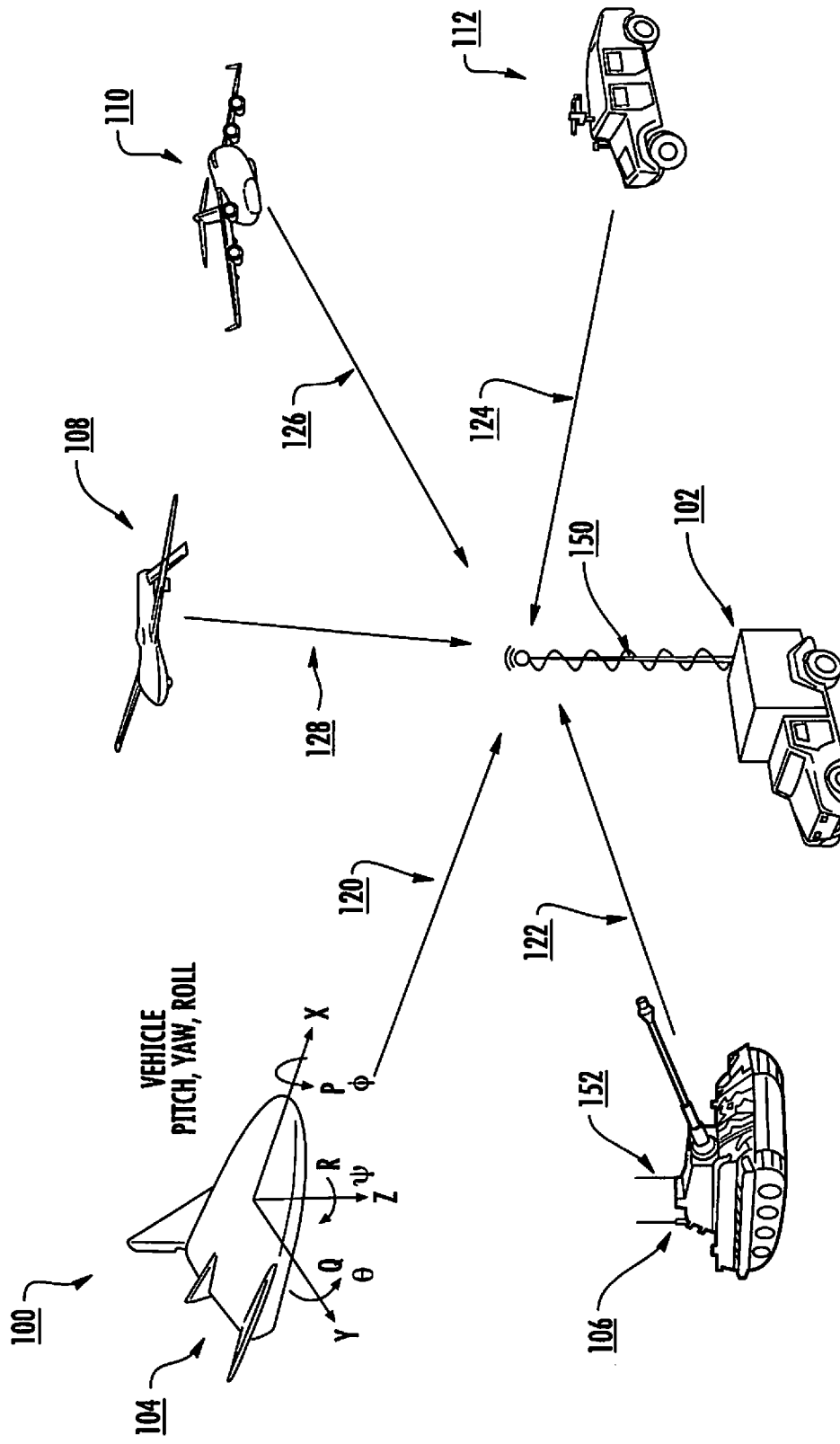
FIG. 1 is a schematic illustration of an exemplary communication system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present document generally describes a SISO physical layer link structure and the associated receive processing for a burst communication system where multiple signals collide in a receiver. The term "physical layer", as used herein, refers to a waveform, a structure of the waveform, how a transmitter communicates the waveform from point A to point B, and how the waveform is processed by a receiver. The signals can include, but are not limited to, signals communicated over LOS links.

Notably, signal collision is not prevented in the present systems using link negotiation. The term "link negotiation", as used herein, refers to mechanisms for allowing only one transmitter to be received on a particular channel at any given time. Such mechanisms include, but are not limited to, hardware and/or software configured to assign one or more timeslots during which a single transmitting communication device can transmit data in a network and during which receiving communication devices listen for communications from the transmitting device.

Instead of "link negotiation", the present invention uses Turbo MUD processing methods to successfully receive the data of all colliding co-channel signals with a relatively high degree of success. The term "co-channel signals", as used herein, refers to two or more signals transmitted from two or more transmitters at the same frequency. The Turbo MUD processing methods will be described in detail below. Still, it should be understood that the Turbo MUD processing methods assume that the receiver does not know in advance the following parameters: how many signals are in a collision cluster; and the timing, amplitude, carrier phase, and/or frequency offset of the signals in the collision cluster. These unknown parameters are estimated by a receiver, as will become more evident as the discussion progresses.

Exemplary System Architecture and Transmit Signal Description

Referring now to FIG. 1, there is provided a schematic illustration of an exemplary communication system 100 that is useful for understanding the present invention. The communication system 100 is an ad hoc system comprising a plurality of mobile transmitting devices 104-112 and a mobile receiving device 102. The mobile transmitting devices 104-112 have a single transmit antenna 152. Similarly, the mobile receiving device 102 has a single receive antenna 150. As such, the communication system 100 is a SISO communication system. Notably, each of the devices 102-112 can have at least one electronic circuit configured to perform one or more of the methods described below.

The transmitting devices 104-112 communicate with the receiving device 102 via communication links 120-128, respectfully. The communication links 120-128 include, but are not limited to, LOS links. The transmitting devices 104-112 can dynamically enter and exit a receiving device's range. As such, networks of users dynamically coalesce and then dissolve. Also, two or more of the transmitting devices 104-112 may transmit signals simultaneously to the receiving device 102. In such scenarios, signal collision at the receiving device 102 occurs.

Figure 2:
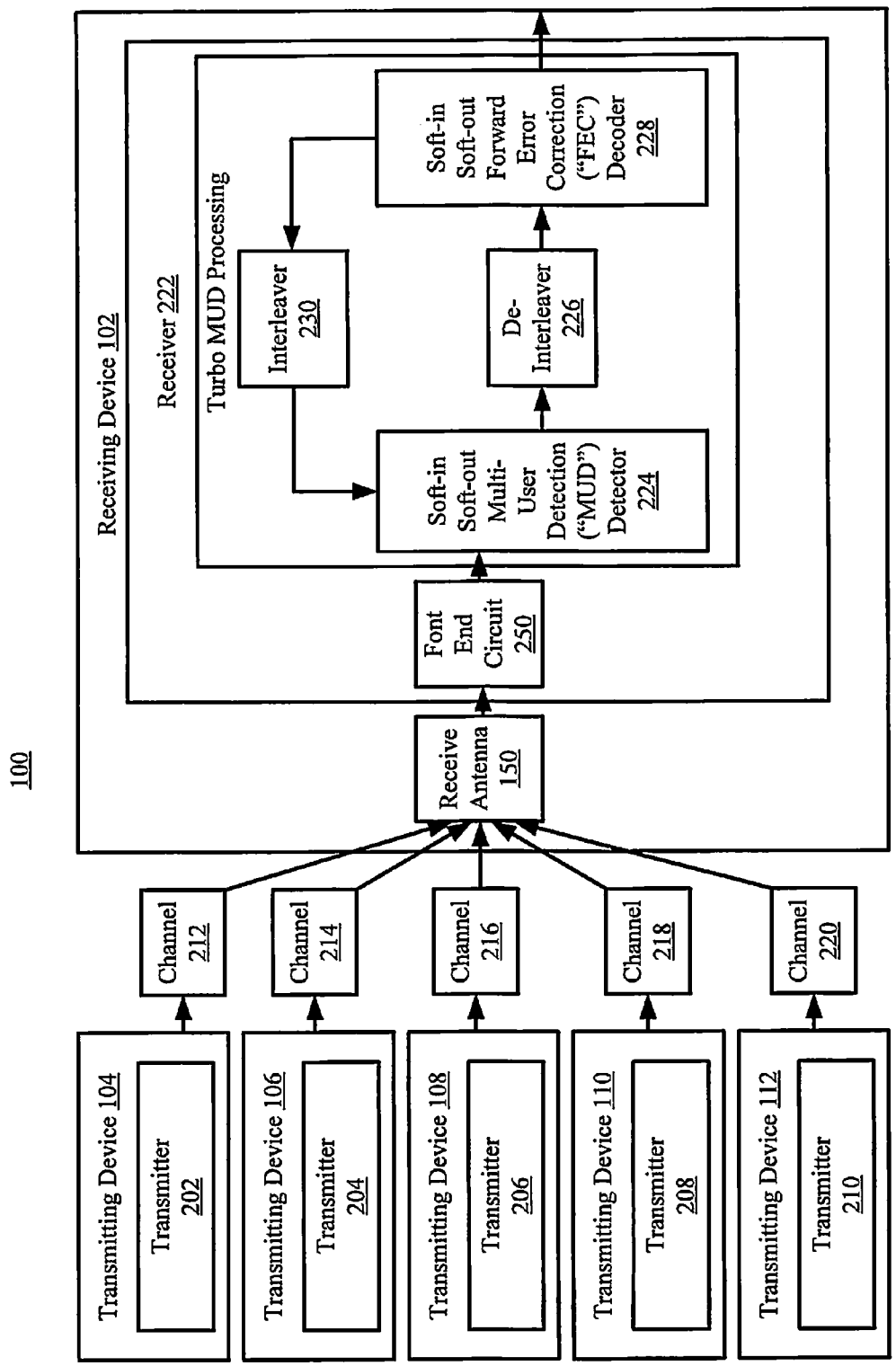
FIG. 2 is a more detailed block diagram of the communication system shown in FIG. 1.

Referring now to FIG. 2, there is provided a more detailed block diagram of the communication system 100 shown in FIG. 1. As shown in FIG. 2, each transmitting device 104-112 comprises a transmitter 202-210 for transmitting signals at the same frequency via a channel 212-220 to the receiving device 102, respectively. An exemplary architecture for transmitters 202-210 will be discussed below in relation to FIG. 3. The channels 212-220 comprise, but are not limited to, a plurality of different LOS channels.

At any given time, signals transmitted from two or more transmitting devices 104-112 at the same frequency can be simultaneously received by receive antenna 150. The simultaneously received signals are also referred to herein as "colliding co-channel signals". At the receive antenna 150, the colliding co-channels signals are combined together (i.e., added) to form a single combined signal which is passed to front end circuit 250 of the receiving device 102.

Front end circuits of receivers are well known in the art, and therefore will not be described in detail herein. Still, it should be understood that the front end circuit 250 down converts, filters and samples the combined signal. This type of filtering can be performed using an anti-alias filter. The samples are analog samples that are subsequently converted to digital samples. The sampling can be achieved using an Analog-to-Digital Converter ("ADC"). The digital samples are then forwarded from the front end circuit 250 to the soft-in soft-out MUD detector 224, such that Turbo MUD processing can be performed thereon. Anti-alias filters and ADC converters are well known in the art. Any known or to be known anti-alias filter and ADC converter can be used herein without limitation.

The soft-in soft-out MUD detector 224 and components 226-230 collectively provide a device for converting received signals from their transmitted form (e.g., a Phase Shift Keying ("PSK") format or a Minimum Shift Keying ("MSK") format) into a form (e.g., a binary format) interpretable to other electronic components of the receiving device 102. In this regard, the soft-in soft-out MUD detector 224 and soft-in soft-out FEC decoder 228 ping-pong information back and forth until the receiver 222 determines that it successfully received one of the colliding co-channels signals of interest, or times out. The soft-in soft-out MUD detector 224 and soft-in soft-out FEC decoder 228 will be described in detail below. Still, it should be understood that the soft-in soft-out MUD detector 224 generally computes interference estimates, computes bit and symbol likelihood values, and performs interference cancellation operations. The soft-in soft-out FEC decoder 228 generally employs an FEC technique to mitigate bit errors in the signal being processed.

Notably, an interleaver 230 and a de-interleaver 226 reside between the soft-in soft-out MUD detector 224 and soft-in soft-out FEC decoder 228. Interleavers and de-interleavers are well known in the art, and therefore will not be described in detail herein. Still, it should be understood that these components 226, 230 are provided to improve the FEC technique employed by the soft-in soft-out FEC decoder 228. In this regard, errors in a colliding co-channel signal may occur in bursts rather than independently. If the number of errors within a code word exceeds the FEC code's capability, then the soft-in soft-out FEC decoder 228 fails to recover the original word. Interleaving ameliorates this problem by shuffling source bits, thereby creating a more uniform distribution of errors. Any known or to be known interleaver and de-interleaver architecture can be used with the present invention without limitation.

Figure 3:
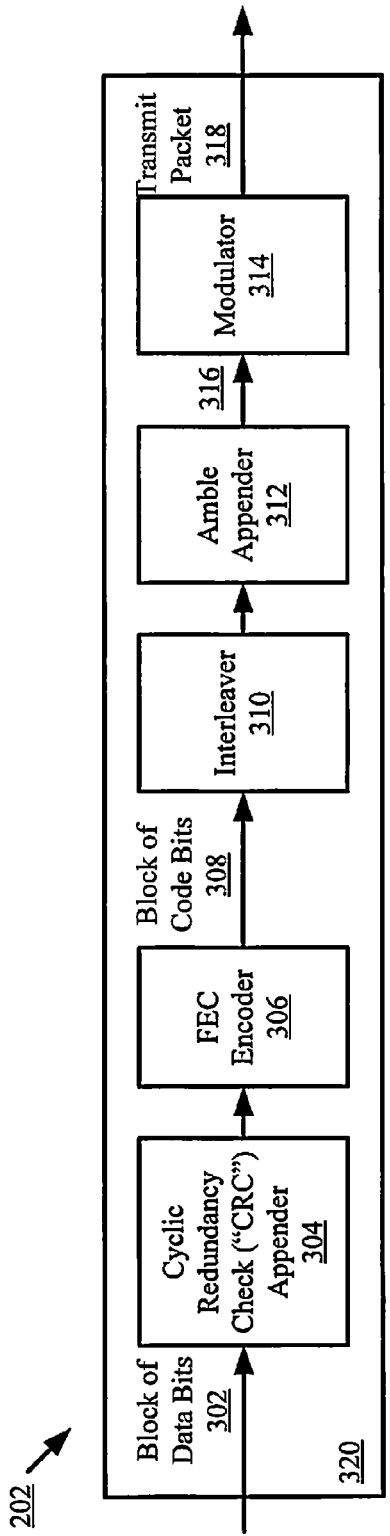
FIG. 3 is a more detailed schematic illustration of an exemplary architecture for transmitter shown in FIG. 2.

Referring now to FIG. 3, there is provided a more detailed schematic illustration of an exemplary architecture for transmitter 202 of FIG. 2. Each of the transmitters 204-210 are the same as or similar to transmitter 202. As such, the following discussion of transmitter 202 is sufficient for understanding transmitters 204-210. Transmitter 202 can include more or less components that are shown in FIG. 3. Still, the architecture of FIG. 3 is sufficient for illustrating the manner in which a transmit packet (i.e., a code frame) of a co-channel signal is generated at a transmitter. Notably, transmitter 202 will be described herein as employing a 1-to-2 bit per symbol modulation scheme, such as a Binary PSK ("BPSK") digital modulation scheme, a Quadrature PSK ("QPSK") digital modulation scheme or a Gaussian MSK ("GMSK") digital modulation scheme. Embodiments of the present invention are not limited in this regard. Alternatively, the transmitter 202 can employ higher level modulation schemes, such as an 8-PSK modulation scheme and a 16 Quadrature Amplitude Modulation (QAM) modulation scheme.

Transmitter 202 is generally configured to convert a block of data bits 302 to a waveform at some Radio Frequency ("RF"). In this regard, transmitter 202 comprises a Cyclic Redundancy Check ("CRC") appender 304, an FEC encoder 306, an interleaver 310, an amble appender 312, and a modulator 314. The CRC appender 304 employs a CRC technique for adding CRC bits to the block of data bits 302. CRC techniques are well known in the art, and therefore will not be described herein. Still, it should be understood that the CRC bits are used by receiving device 102 to determine if it has successfully received the block of data bits 302. Any known or to be known CRC technique can be implemented herein without limitation. For example, a block 302 comprises one hundred data bits. CRC bits are added to the block of data bits 302 for purposes of providing a mathematical framework for error detection at the receiving device 102. At the receiving device 102, the CRC appended block of data bits is processed in the context of the mathematical framework provided by the CRC code. Based on this processing, the receiving device 102 determines if one or more errors most likely exist in the respective demodulated signal of interest within the colliding co-channel signal. Embodiments of the present invention are not limited to the particularities of this example.

After appending the CRC bit(s) to the block of data bits 302, the FEC encoder 306 adds FEC bits to the output of the CRC appender 304 so as to form a block of code bits 308. In some scenarios, one or two extra FEC bits are added for every data bit of block 302. The FEC bits generally allow the receiving device 102 to successfully receive the block of data bits 302 transmitted over an unreliable or noisy channel. More particularly, the FEC bits allow the receiving device 102 to detect a limited number of errors that may occur anywhere in the transmitted block of data bits, and often to correct these errors without retransmission. The FEC encoder 306 can employ any known or to be known FEC technique that allows the use of a peer soft-in soft-out FEC decoder in the receiver that takes in and outputs log likelihood ratios or approximations thereof.

The block of code bits 308 are then communicated from the FEC encoder 306 to the interleaver 310. The interleaver 310 allows the receiving device 102 to disperse burst errors, as described above. Subsequently, at the ample appender 312, a pre-amble and a post-amble are appended to the output of the interleaver 310. Pre-ambles and post-ambles are well known in the art, and therefore will not be described in detail herein. Still, it should be understood that the pre-amble comprises a fixed pattern for providing an indication to the receiving device 102 of the start of a co-channel signal. The post-amble comprises a fixed pattern providing an indication to the receiving device 102 of the end of a co-channel signal.

The output 316 of the amble appender 312 is then communicated to the modulator 314. The modulator 314 employs a digital modulation scheme that conveys the data 316 by changing, or modulating, the amplitude, frequency, and/or phase of a reference signal. Digital modulation schemes are well known in the art, and therefore will not be described herein. Such digital modulation schemes include, but are not limited to, BPSK, QPSK and GMSK. The output of the modulator 314 is referred to as a transmit packet (i.e., code frame) 318.

Figure 4:
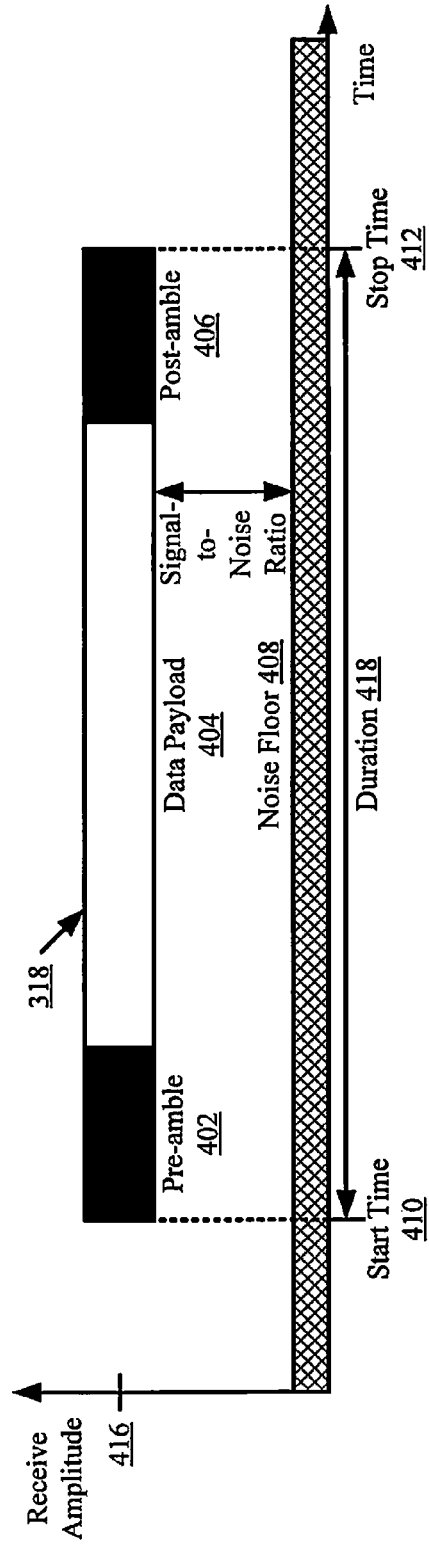
FIG. 4 is a perspective of a waveform when received by a receiver of the receiving device shown in FIG. 2.

A schematic illustration of the transmit packet (i.e., code frame) 318 is provided in FIG. 4. As shown in FIG. 4, the transmit packet 318 comprises a pre-ample 402, data payload 404, and a post-amble 406. The data payload 404 includes the CRC bits, FEC bits, block of data bits 302 and headers/trailers of protocol stack layers (not shown). Headers and trailers are well known in the art, and therefore will not be described herein. The data payload 404 is the portion of the transmit packet 318 that is to be recovered by the receiver 222 of the receiving device 102.

FIG. 4 also shows a perspective of a waveform when received by receiver 222 of receiving device 102. As can be seen in FIG. 4, the receiver 222 first detects noise. Shortly thereafter, the receiver 222 detects the on-set of the pre-amble 402 of the waveform at a start time 410. At start time 410, the receiver 222 detects a pre-amble 402, thereby determining that a signal is starting. The incoming waveform has a certain amplitude 416 above the noise floor 408 and a duration 418. The duration 418 begins at start time 410 and ends at stop time 412. The post-amble 406 allows the receiver 222 to detect the stop time 412 of the waveform, i.e., when the signal is ending.

Figure 5:
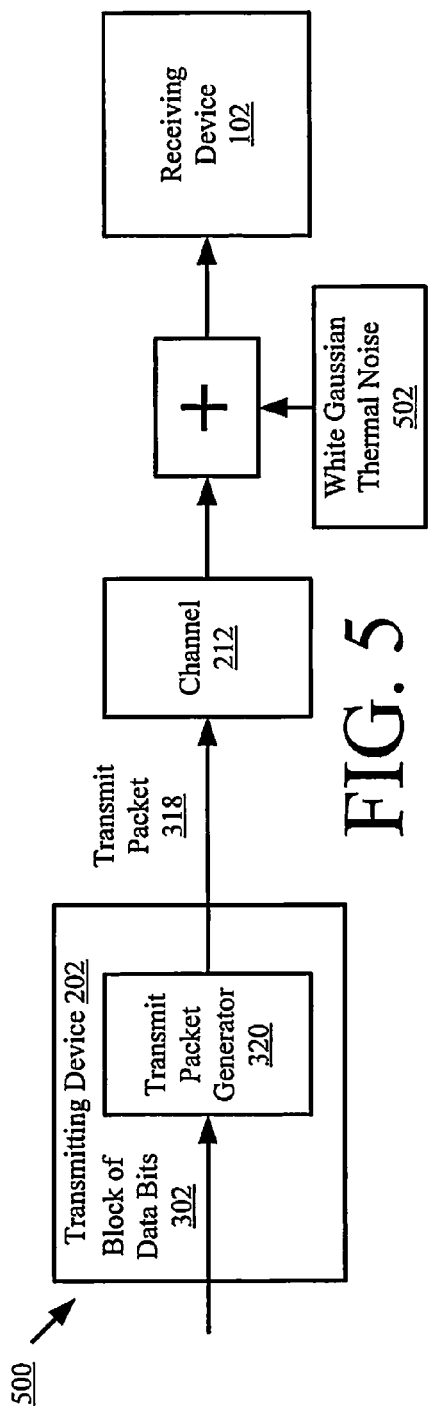
FIG. 5 is a schematic illustration of an exemplary Line-Of-Sight ("LOS") channel model for a channel of FIG. 2.

Referring now to FIG. 5, there is provided a schematic illustration of an exemplary LOS channel model 500 for channel 212. Channels 214-220 are the same as or similar to channel 212. As such, the following discussion of channel 212 is sufficient for understanding channels 214-220. The model 500 is assumed to only impose a time delay, an amplitude change and a carrier phase shift to the co-channel signal. A frequency offset can exist between the transmitting device 202 and the receiving device 102. The frequency offset can result from: oscillator mismatch between the transmitter 202 and receiver 222; and/or Doppler offset due to relative movement between the transmitter 202 and receiver 222. The listed parameters (i.e., amplitude, carrier phase, frequency offset, and timing) are assumed to be essentially constant over the transmit packet (i.e., code frame). The receiver 222 estimates the above-listed parameters for every transmit packet in each colliding co-channel signal, as will be discussed below.

Single User Receiver with Parameter Estimation Description

Figure 6:
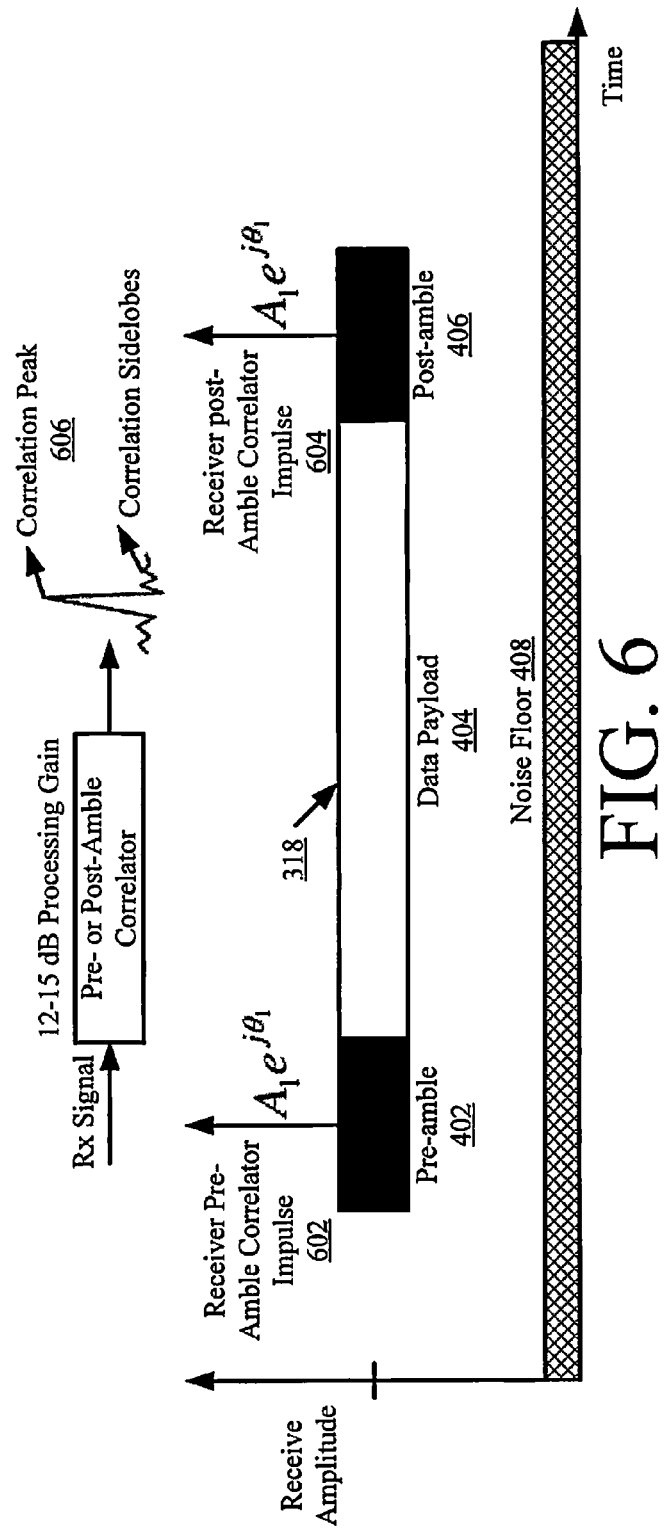
FIG. 6 is a schematic illustration that is useful for understanding how an amplitude and phase of a waveform is estimated by a receiver using a pre-amble and a post-amble

The amplitude and carrier phase of a waveform is estimated by the receiver 222 using a correlation technique. Correlation techniques are well known in the art, and therefore will not be described herein. Still, it should be understood that the correlation technique employed by receiver 222 is used to correlate for the pre-amble 402 and post-amble 406. The ambles 402, 406 comprise sync patterns with known waveform shapes. The ambles 402, 406 also have impulsive correlation properties and a known separation in time. Once the known waveform shape of the pre-amble or post-amble is detected, the receiver 222 performs operations to determine the location of the correlation peak of the ambles. As shown in FIG. 6, impulse 602 identifies the location in the pre-amble 402 of the correlation peak 606. Similarly, impulse 604 identifies the location in the post-amble 406 of the correlation peak 606. The correlation peaks 606 provide estimates of the amplitude and carrier phase of the waveform at particular times.

The frequency offset of a waveform is also estimated by the receiver 222 using the pre-amble 402 and post-amble 406. If there is a frequency offset, then the signal's phase is spinning in a real and imaginary plane due to the fact that there is a relative offset in the frequency between the transmitter 202 and receiver 222. The phase rotation observed over a transmit packet (i.e., code frame) is proportional to the frequency offset of the waveform, assuming that the frequency offset is small enough that the phase rotation from the pre-amble to the post-amble is sufficiently less than ±180 degrees. Accordingly, by looking at how the phase changed between impulse 602 and impulse 604, the receiver 222 can compute an estimate of the frequency offset. The frequency offset estimate is defined by the following mathematical equation (1).

$$f_{estimate} = (\theta_2 - \theta_1)/2\pi T_\Delta \tag{1}$$

where $f_{estimate}$ represents the estimate of the frequency offset. $\theta_1$ represents a phase of a waveform when impulse 602 occurs. $\theta_2$ represents the phase of the waveform when impulse 604 occurs. $T_\Delta$ represents the time period between the occurrence of impulse 602 and impulse 604.

The timing can also be estimated by the receiver 222 using the pre-amble 402 and post-amble 406. When the receiver 222 correlates, it detects the correlation peak 602 of the analog pre-amble 402 and analog post-amble 406. The pre-amble digital samples output from the correlator straddle the correlation peak of the analog pre-amble, as shown in FIG. 8, since sampling is a discrete process. Similarly, the post-amble digital samples straddle the correlation peak of the analog post-amble. FIG. 8 is a notional diagram to illustrate that the analog correlation peak 606 is between the two digital samples 802 and 804. By looking at the pre-amble digital samples which straddle the correlation peak of the analog pre-amble and the post-amble digital samples which straddle the correlation peak of the analog post-amble, the receiver 222 can resolve fine timing, i.e., determine exactly where the true correlation peak of the analog pre-amble or analog post-amble is relative to two digital samples 802, 804. The location of the true collection peak is then used to compute the fine timing offset between the incoming signal and the receive sampling. The fine timing offset is then used by the receiver 222 to identify or design a matched filter 902 required for the incoming signal.

The matched filter 902 of FIG. 9 generally compensates for any fine timing offset, so at the output the correlation peak occurs on sample, and all receiver symbols are sampled optimally. More particularly, the matched filter 902 of FIG. 9 maximizes the Signal-to-Noise Ratio ("SNR") of the digital samples and aligns the post match-filtered correlation peak of the digital sample stream with the sample timing. As a result of such alignment, the amplitude peak of the pre-amble or post-amble post matched-filter digital samples is maximized and optimized for mid-symbol timing. Notably, in the multi-user case a matched filter will be identified or designed for each incoming colliding co-channel signal, as explained below.

Figure 10:
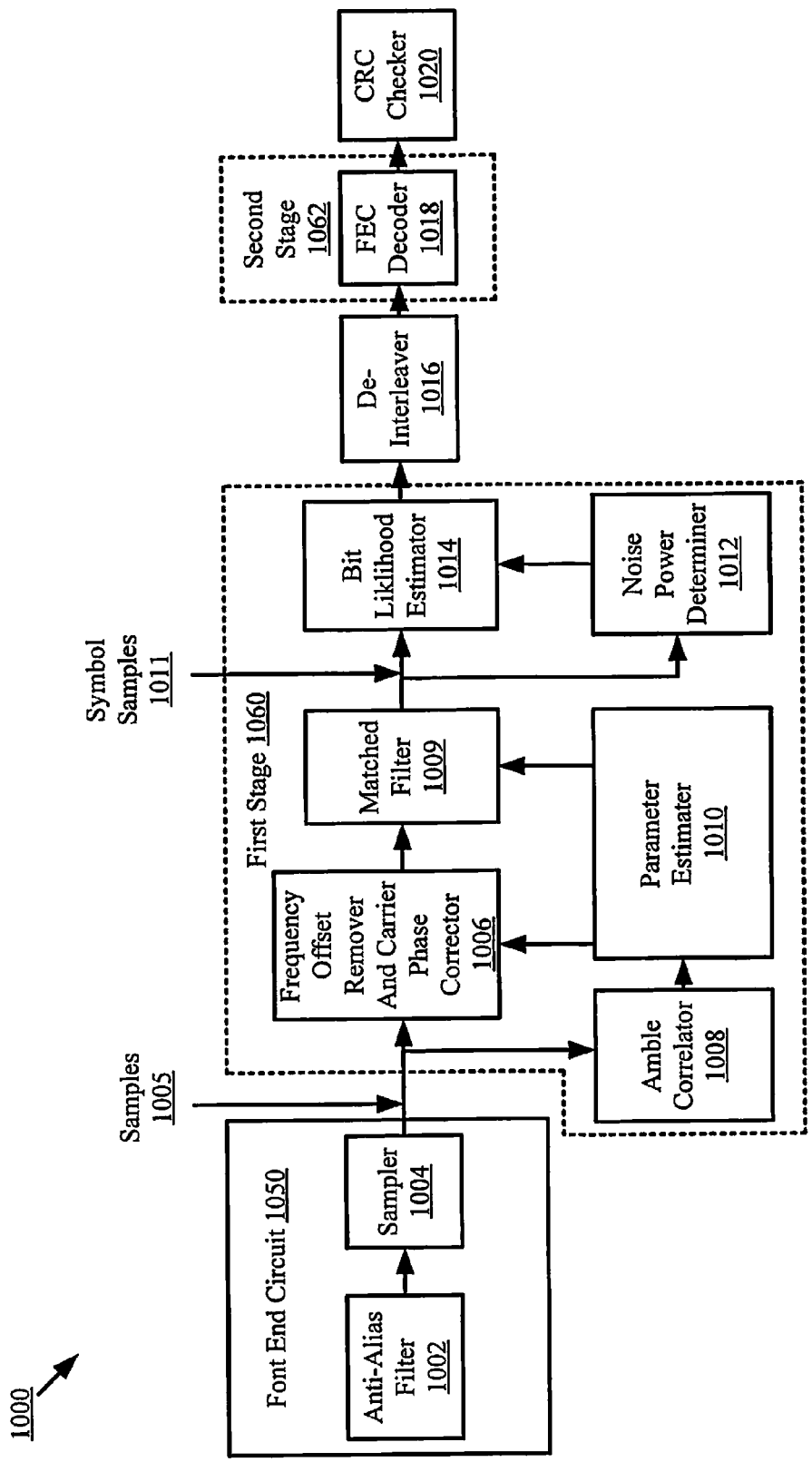
FIG. 10 is a detailed block diagram that is useful for understanding how estimated parameters are used by the receiver when it is receiving only one signal during a given period of time.

Referring now to FIG. 10, there is provided a detailed block diagram that is useful for understanding how the estimated parameters are used by a receiver 1000 when it is receiving only one signal during a given period of time. As shown in FIG. 10, the front end circuit 1050 comprises an anti-alias filter 1002 and a sampler 1004. The samples 1005 output from the sampler 1004 are then passed to a first stage 1060 of a Turbo MUD process.

Figure 7:
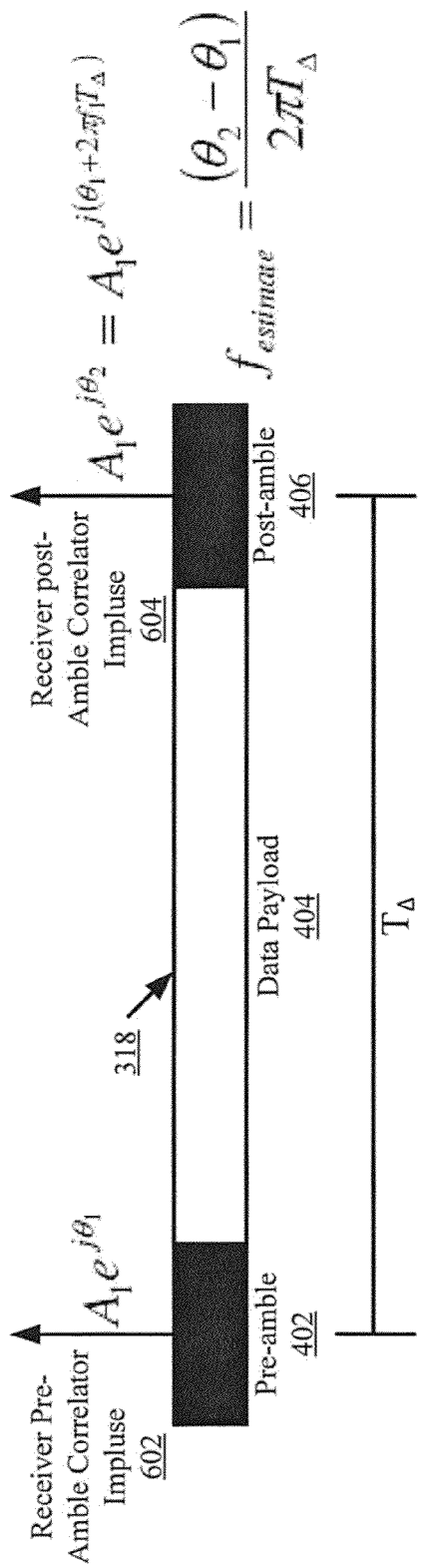
FIG. 7 is a schematic illustration that is useful for understanding how a frequency offset of a waveform is estimated by a receiver using a pre-amble and a post-amble.

During the first stage 1060, the samples 1005 are used by the amble correlator 1008 to correlate a pre-amble and a post-amble. The results of the correlation are then used by the parameter estimator 1010 to determine estimates of various parameters. The parameters include, but are not limited to, the amplitude, carrier phase, timing and frequency offset. These parameters are determined in the manner described above in relation to FIGS. 6-7. The estimated frequency offset in the signal is removed by component 1006. Also, the carrier phase of the signal is corrected by component 1006. The output of component 1006 is then communicated to the matched filter 1009. The matched filter 1009 maximizes the SNR so as to produce symbol samples 1011 aligned with correlation peaks of the post match-filtered signal.

The symbol samples 1011 are used by the noise power determiner 1012 to compute an estimate of noise power or variance. The noise power or variance is defined by the following mathematical equation (2).

$$\sigma^2_n \sigma^2_r + \sigma^2_I \quad (2)$$

for complex Gaussian noise where typically $\theta^2_r = \sigma^2_I$ and $\sigma^2_n = \sigma^2_r$, for real Gaussian noise (i.e., $\sigma^2_I = 0$). To estimate the noise power or variance, the noise power determiner 1012 measures the noisy receive sample distribution about ideal constellation points at the output of the matched filter 1009 (best timing, frequency offset removed, carrier phase corrected, and amplitude compensated for relevant modulations).

Figure 11:
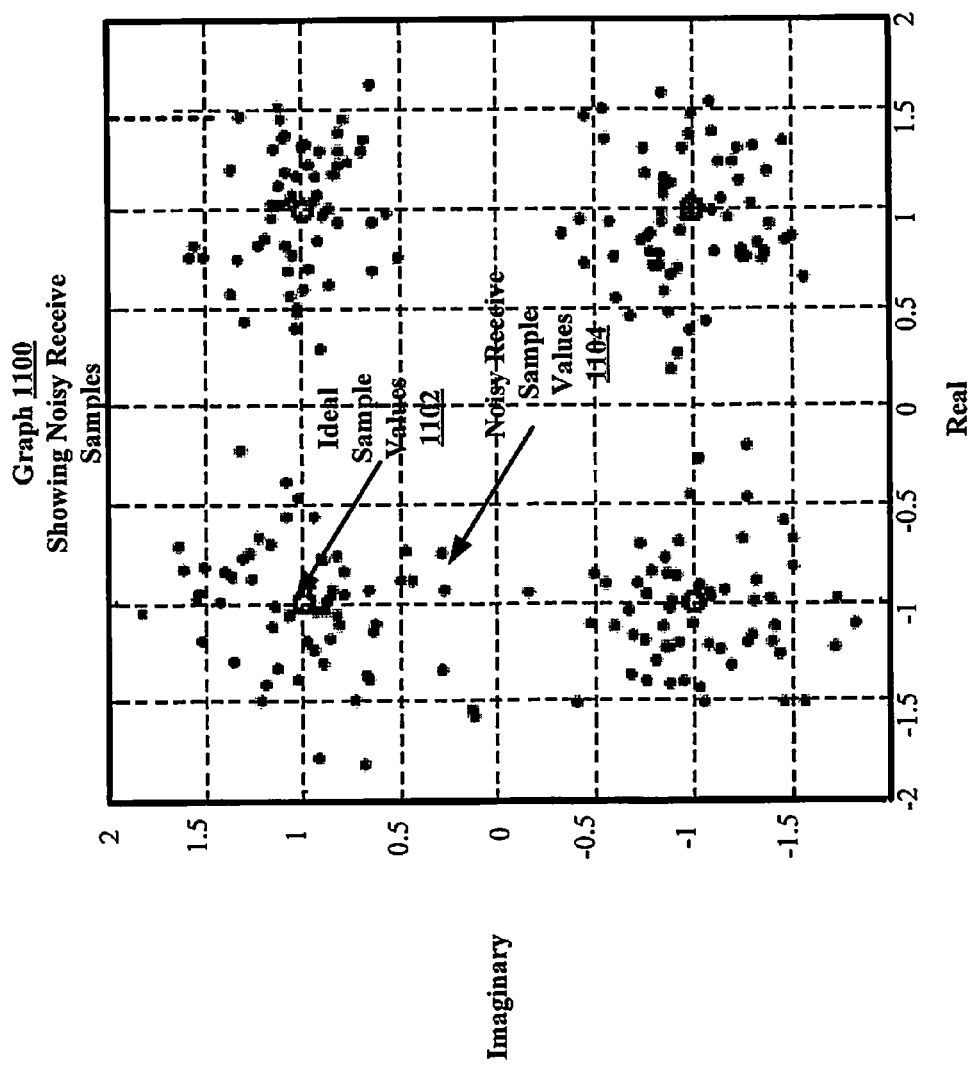
FIG. 11 is a graph showing the distribution of noisy receive samples about ideal constellation points at an output of a matched filter.

A QPSK example sample distribution of noisy receive samples is shown in the graph 1100 of FIG. 11 for a 10 dB SNR case. Graph 1100 comprises values 1102 for ideal samples and values 1104 for a plurality of noisy received samples output from matched filter 1009. To estimate the noise power or variance, the noise power determiner 1012 can: (1) subtract the power of the ideal samples from the total power of the noisy receive sample; (2) average a squared distance of the noisy receive samples from the corresponding closest ideal sample; or (3) compute a maximum likelihood noise power estimate using standard methods.

Notably, interference from other signals act similar to thermal noise, causing the receive samples to scatter in the plot of FIG. 11. While the interference is not Gaussian, the receiver 1000 makes the assumption that it is for bit and symbol likelihood computation. On subsequent Turbo MUD processing iterations, the interference will be at least partially canceled. During Turbo MUD processing, there will be errors in the parameter estimates for each signal. This will increase the noisiness of the receive sample scatter graph 1100, increasing the noise power estimate. This works well because the bit and symbol likelihoods will automatically be degraded (become less confident) in a graceful manner when parameter estimates are less accurate. After each Turbo MUD processing iteration, the parameter estimates tend to become more accurate.

Referring again to FIG. 10, the noise power or variance estimate is then provided to the bit likelihood estimator 1014. The bit likelihood estimator 1014 uses the noise power and optimal theory to determine how noisy each symbol sample 1011 is and computes a first bit likelihood value estimating an accuracy of the bit value(s) for each symbol sample 1011.

If a BPSK or GSM like GMSK modulation scheme is employed, then one coded bit is represented by each complex symbol. GSM like GMSK modulation schemes are well known and understood by those skilled in the art, and therefore will not be described herein. The real component of the matched filter output complex symbol represents the coded bit. In this scenario, the first bit likelihood value is defined by the following mathematical equation (3), which is optimal in probability theory for assigning a confidence level to data in noise.

$$LLR(x/b) = \log\left\{\frac{P(x/b=+1)}{P(x/b=-1)}\right\} = -\frac{(x-A)^2}{\sigma^2_r} + \frac{(x-A)^2}{\sigma^2_r} = \frac{2Ax}{\sigma^2_r} \quad (3)$$

where LLR (x/b) represents the first bit likelihood value. $\sigma^2_r$ represents the noise power of a real component of a noisy received complex sample. x represents a value of a real part 1202 of a noisy received complex sample, as shown in FIG. 12. A represents an amplitude value 1204 of a noise free symbol point 1204 as also shown in FIG. 12. For an ideal noise free link, the amplitude of the received symbols would lie on or be equal to ±A, corresponding to a ±1 code bit symbol, in turn corresponding for example to a bit with a value of 1 or 0. The noise power causes the amplitude of the receive symbols to deviate from the ideal points or values ±A.

In contrast if a QPSK modulation scheme is employed, then two coded bits are represented by each complex symbol. The imaginary component of the complex symbol represents a first coded bit, while the real component of the complex symbol represents a second coded bit. In this scenario, the first likelihood value is defined by the following mathematical equations (4) and (5).

Real code bit: $LLR_{EXT}(x_r/b) =$ (4)

$$\log\left\{\frac{P(x_r/b=+1)}{P(x_r/b=-1)}\right\} = -\frac{(x_r-A)^2}{\sigma_r^2} + \frac{(x_r-A)^2}{\sigma_r^2} = \frac{2Ax_r}{\sigma_r^2}$$

Imag code bit: $LLR_{EXT}(x_i/b) =$ (5)

$$\log\left\{\frac{P(x_i/b=+1)}{P(x_i/b=-1)}\right\} = -\frac{(x_i-A)^2}{\sigma_i^2} + \frac{(x_i-A)^2}{\sigma_i^2} = \frac{2Ax_i}{\sigma_i^2}$$

where $x_i$ represents a value 1304 of an imaginary component of a noisy received complex sample, as shown in FIG. 13. $x_r$ represents a value 1302 of a real component of a noisy received complex sample, as also shown in FIG. 13. $\sigma_i^2$ represents the noise power of an imaginary component of a noisy received complex sample. $\sigma_r^2$ represents the noise power of a real component of a noisy received complex sample. For most cases, the real and imaginary noise variances are equal, so $\sigma_r^2 = \sigma_i^2$. For an ideal noise free link, the received symbols would lie on ±A, corresponding to a ±1 code bit symbol, in turn corresponding for example to a bit with a value of 1 or 0. The noise power causes the receive signal to deviate from the ideal points ±A. Notably, the noise on the real axis is statistically independent of the noise on the imaginary axis.

Once the first bit likelihood values are estimated, they are communicated to the second stage of the Turbo MUD process. The second stage comprises an FEC decoder 1018. The FEC decoder 1018 uses the first bit likelihood values to generate a new and improved set of bit likelihood values (i.e., soft-in soft-out). The bit likelihood values output from the FEC decoder 1018 are referred to herein as second bit likelihood values.

As can be seen in FIG. 10, a de-interleaver 1016 is provided between the first and second stages 1060, 1062 of the Turbo MUD process. The de-interleaver 1016 is provided to improve the FEC technique employed by the FEC decoder 1018. In this regard, errors in an incoming signal typically occur in bursts rather than independently. If the number of errors within a code word exceeds the FEC code's capability, then the FEC decoder 1018 fails to recover the original word. Interleaving ameliorates this problem by shuffling source bits, thereby creating a more uniform distribution of errors. Any known or to be known de-interleaver architecture can be used with the present invention without limitation.

The output of the FEC decoder 1018 is passed to a CRC checker 1020. The CRC checker 1020 determines whether samples were decoded correctly. CRC techniques for making such a determination are well known in the art, and therefore will not be described herein. Any known or to be known CRC technique can be used with the present invention without limitation.

Single User Frequency Hopped Description

Referring now to FIG. 14, there is provided a block diagram of an exemplary transmitter 1400 employing frequency hopping technology. The transmitter 1400 can be used in frequency hopped single user transmit applications. Notably, the transmitter 1400 has an architecture similar to that of the transmitter shown in FIG. 3. In this regard, the transmitter 1400 comprises a CRC appender 1404, an FEC encoder 1406, an interleaver 1410, an amble appender 1414, and a modulator 1416. Each of these components 1404-1410, 1414, 1416 is the same as or similar to the respective component 304, 306, 310-314 of FIG. 3. Therefore the discussion above in relation to components 304, 306, 310-314 is sufficient for understanding components 1404-1410, 1414, 1416. Still, it should be understood that the interleaver 1410 spans the whole code block which spans all the hops in a transmit packet (i.e., code frame).

As shown in FIG. 14, the transmitter 1400 includes two additional components 1412 and 1418. Component 1412 is a hop block generator configured to subdivide an interleaved block of coded bits 1411 into N hop blocks, where N is an integer. Ambles are appended to each hop block by amble appender 1414 so as to form a plurality of packet segments. Component 1418 is a frequency hop synthesizer configured to generate a code frame 1420, wherein each segment of a transmit packet (i.e., code frame) is transmitted at a different pre-defined frequency. Hop block generators and frequency hop synthesizers are well known in the art, and therefore will not be described in more detail herein. Any known or to be known hop block generator and/or frequency hop synthesizer can be used herein without limitation.

A schematic illustration of code frame 1420 (i.e., transmit packet) is provided in FIG. 15. As shown in FIG. 15, the code frame 1420 comprises a plurality of packet segments 1502, 1504, 1506, 1508 arranged in a serial manner. Each packet segment 1502-1508 includes a pre-amble 1510, a data payload 1512, and a post-amble 1514. Each packet segment 1502-1508 is transmitted at a different pre-defined frequency 1520-1526.

Figure 16:
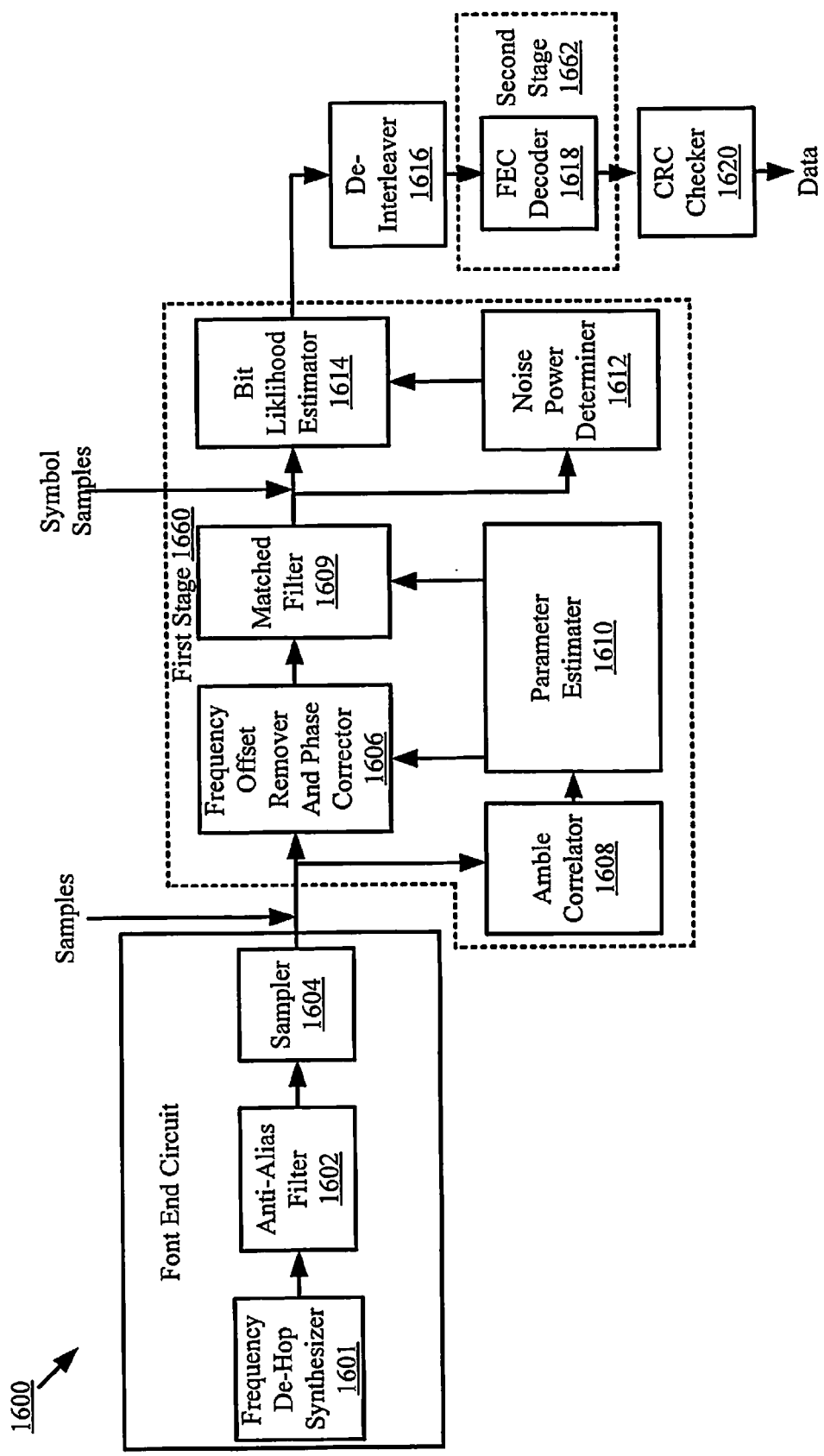
FIG. 16 is a block diagram of a receiver employing frequency de-hopping technology.

Referring now to FIG. 16, there is provided a block diagram of an exemplary receiver 1600 employing frequency de-hopping technology. The receiver 1600 can be used in frequency hopped single user receive applications. Notably, the receiver 1600 has an architecture similar to that of the receiver shown in FIG. 10. In this regard, the receiver 1600 comprises an anti-alias filter 1602, a sampler 1604, an amble correlator 1608, a parameter estimator 1610, a frequency and phase offset remover 1606, a matched filter 1609, a bit likelihood estimator 1614, a de-interleaver 1016, an FEC decoder 1018, and a CRC checker 1020. Each of these listed components 1602-1620 is the same as or similar to a respective component 1002, 1004, 1006-1010, 1012, 1014-1020 of FIG. 10. The description of components 1002, 1004, 1006-1010, 1012, 1014-1020 provided in relation to FIG. 10 is sufficient for understanding components 1602-1620.

As shown in FIG. 16, receiver 1600 comprises an additional component 1601. Component 1601 is a frequency de-hop synthesizer. Frequency de-hop synthesizers are well known in the art, and therefore will not be described herein. Any known or to be known frequency de-hop synthesizer can be used herein without limitation.

During operation, the receiver 1600 correlates for the ambles of each packet segment and performs user detection (signal discovery) by observing all frame hops or less than all frame hops. Following signal discovery, signal parameter estimation can ensue. Notably, nominal received signal timing-offset relative to a hop boundary is assumed constant, to within a symbol period. The frequency offset is assumed constant across all hops to within a Part Per Million ("PPM") parameter. Hence, the frequency offset can be estimated using all hops. All other parameters may be independently estimated in each hop. These parameters include, but are not limited to, timing offset, carrier phase, and amplitude. It should also be noted that the matched filter varies from hop to hop due to fine timing offsets.

Multi-User Transmit Signal Description

Figure 17:
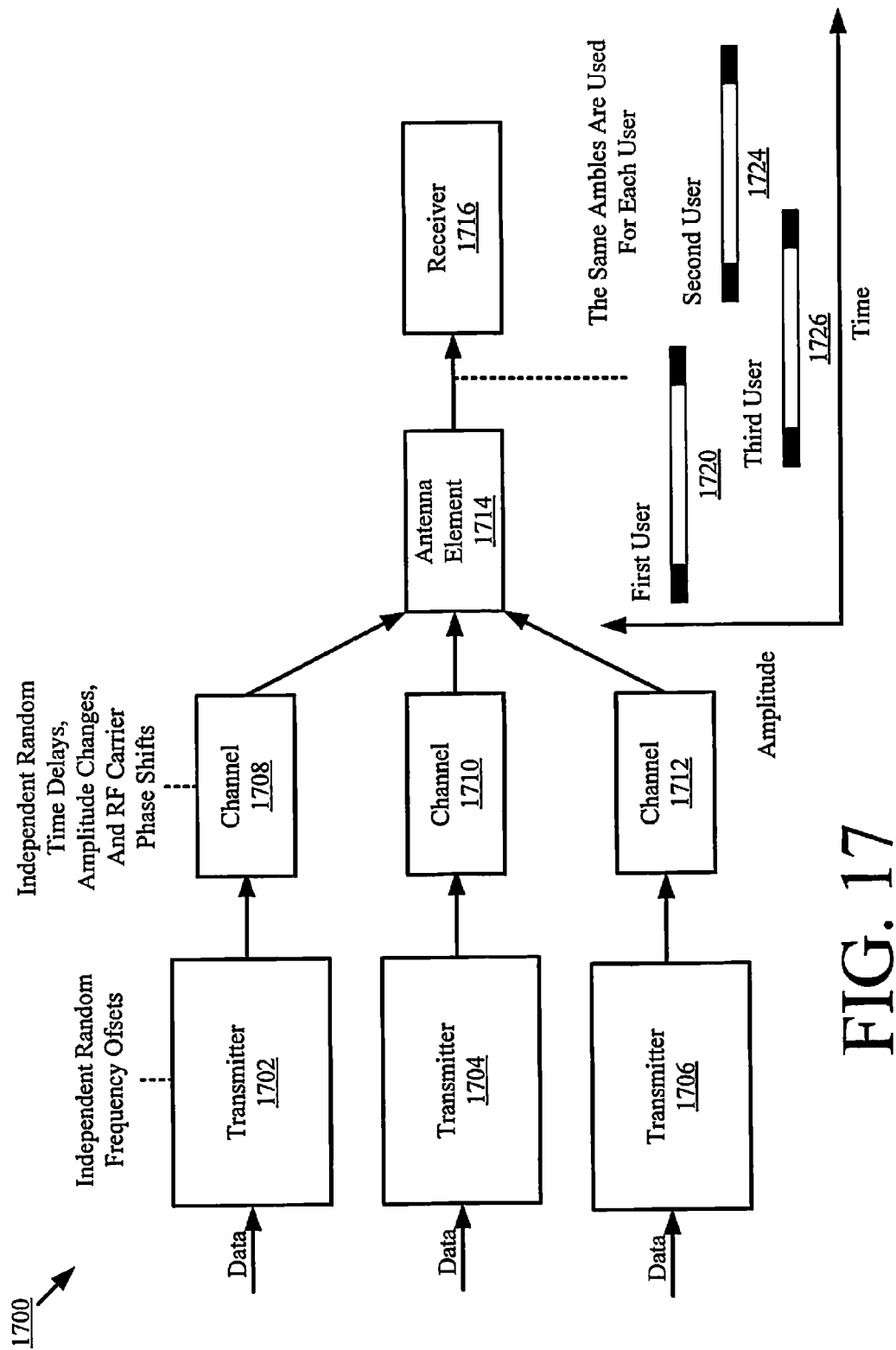
FIG. 17 is a schematic illustration of a multi-user channel model that is useful for understanding the present invention.

Referring now to FIG. 17, there is provided a schematic illustration of a multi-user channel model 1700 that is useful for understanding the present invention. As shown in FIG. 17, the channel model 1700 comprises transmitters 1702-1706 and channels 1708-1712 as an illustrative example for the sake of explanation. The channel model 1700 also comprises an antenna element 1714, and a receiver 1716. The transmitters 1702-1706 transmit signals 1720-1726 at the same frequency over channels 1708-1712, respectively. These signals are referred to herein as co-channel signals. The co-channel signals 1720-1726 are combined together at antenna element 1714 to form a combined co-channel signal. The combined co-channel signal is then forwarded to the receiver 1716 for Turbo MUD processing. In order to successfully perform Turbo MUD processing of each co-channel signal 1720-1726, the receiver 1716 must detect each co-channel signal 1720-1726 within the combined co-channel signal, and separate the co-channel signals 1720-1726.

As shown in FIG. 17, the co-channel signals 1720-1726 arrive at the receiver 1716 with random relative offsets in time, amplitude, carrier phase and frequency PPM. As such, the co-channel signals 1720-1726 for the users are staggered in time and amplitude. Each co-channel signal 1720-1726 can also have its own carrier phase and frequency offset. The uniqueness in time, amplitude and frequency offset of each user allows the receiver 1716 to detect and separate the co-channel signals 1720-1726.

At the receiver 1716, the correlation operations are performed using the pre-ambles and post-ambles of the co-channel signals 1720-1726. As a result of the correlation operations, the receiver 1716 detects (discovers) the presence of each co-channel signal 1720-1726 in the combined co-channel signal received by antenna element 1714. After detecting a co-channel signal, the receiver 1716 begins a Turbo MUD process for decoding the co-channel signal. Each co-channel signal is processed independently, as will be described below. The pre-amble and post-amble correlation operations provide a mechanism for the receiver 1716 to detect (discover) the number of co-channel signals for the initial Turbo MUD processing.

In some scenarios, the RF signal power of a co-channel signal 1726 is less than co-channel signals 1720 and 1724 by a relatively large amount. Consequently, the receiver 1716 does not detect (discover) co-channel signal 1726 during its first correlation operations. However, during Turbo MUD processing, the receiver 1716 will subtract out the best estimates of co-channels 1720 and 1724 from the combined co-channel signal. The resulting signal is then analyzed by the receiver 1716 to determine if any other co-channel signals are present in the combined co-channel signal which was not previously detected (discovered). This determination can be made using pre-amble and post-amble correlation operations, and can again be used to detect (discover) the number of additional co-channel signals, if any, to be included in the Turbo MUD processing. As a result of this analysis, the receiver 1716 can detect co-channel signal 1726 and begin performing a Turbo MUD process using co-channel signal 1726.

Figure 18:
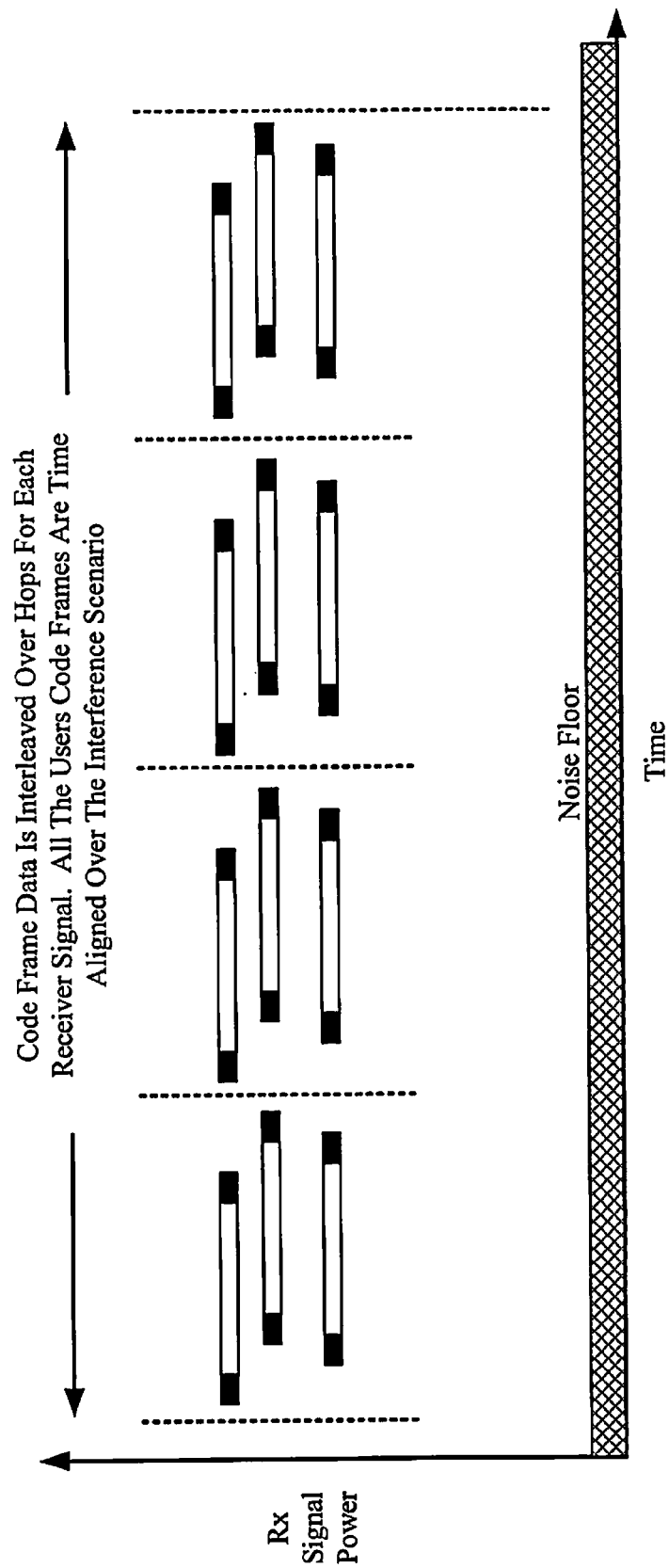
FIG. 18 is a schematic illustration which is useful for understanding a frequency hopped multi-user application.

In some scenarios, the co-channel signals comprise frequency hopped co-channel signals, as shown in FIG. 18. The interference scenario of the hops for all users, in terms of the relative signal timing and amplitude, is relatively constant. Moreover, all user's code frames (i.e., transmit packets) are time aligned over the interference scenario. With this variant, the transmit packet (code frame) of each co-channel signal is spread across multiple frequency hops where the interference pattern is essentially the same in each hop. Each hop has appended ambles. The relative amplitudes, time offsets and frequency offsets may be nominally constant from hop to hop, or not. So, these parameters may be either jointly estimated or individually estimated across all hops in a code frame. The received carrier phase is assumed random for each hop frequency, hence it must be individually estimated across all hops in a code frame. User detection may occur by observing all packet hops if desired.

Multi-User Receiver with Parameter Estimation Description

Many wireless communication systems use a two step communication process. A base station registers with a receiver and then negotiates capabilities and preferred communication modes. Then, the data communication commences using the agreed upon communication mode. This type of system tends to have more latency in data transfer than in the present communication systems.

The context here is blind burst communications where the receiver does not know in advance if or when a data packet will arrive. So, the signal must be detected and processed from a single data packet. Also, multiple user signals may arrive simultaneously as co-channel interference. The goal is to successfully receive all the user data. The present method of communication has less latency then that described above in which link negotiation is employed.

Figure 19:
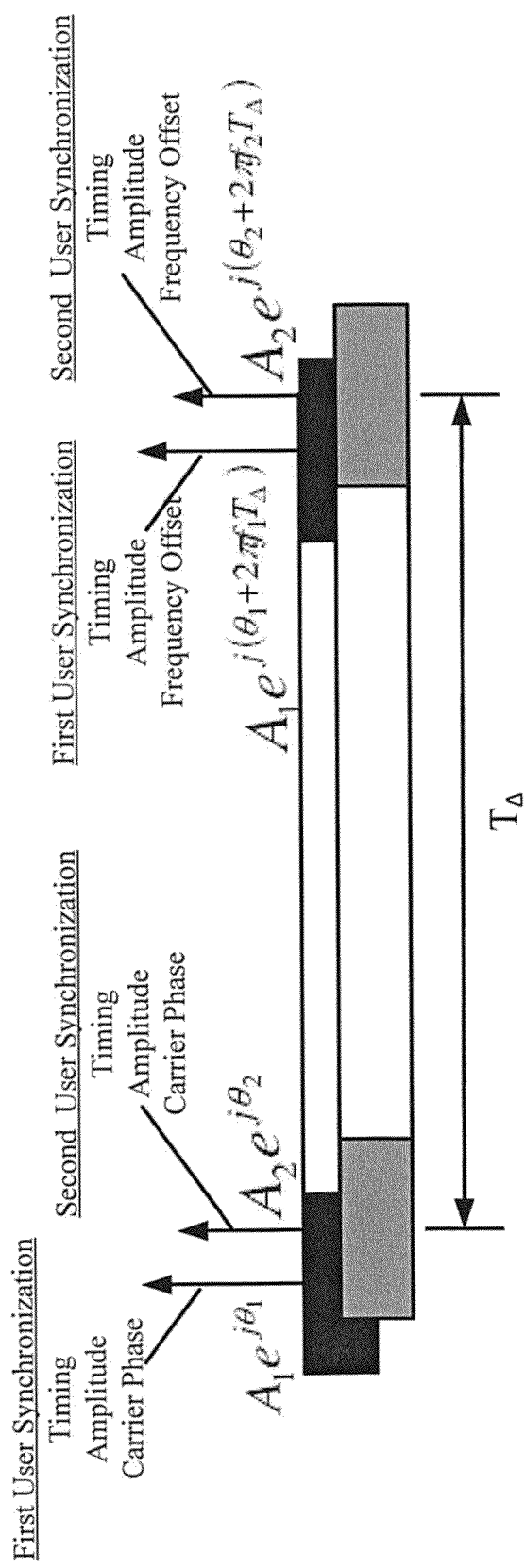
FIG. 19 is a schematic illustration that is useful for understanding receiver multi-signal detection with initial user timing, amplitude, carrier phase and frequency offset.

Referring now to FIG. 19, there is provided a schematic illustration that is useful for understanding receiver multi-signal detection using various parameters. The parameters include, but are not limited to, timing, amplitude, carrier phase and frequency offset. At the receiver, an initial estimate of the interference scenario is provided by the amble correlation process. As shown in FIG. 19, even though the joint interference is severe, the impulsive characteristic and the processing gain of the amble correlation allows multiple users to be identified on a single pass with initial estimates for timing, amplitude, carrier phase and frequency offset. The Turbo MUD processing will then commence using the observed estimates. Note, if two users with the same ambles exactly collide with zero time offset and identical amplitude levels, the receiver will not be able to distinguish those signals. This is considered a catastrophic event. However, it is a low probability event because both the timing and amplitude of two signals is rarely the same.

Figure 20:
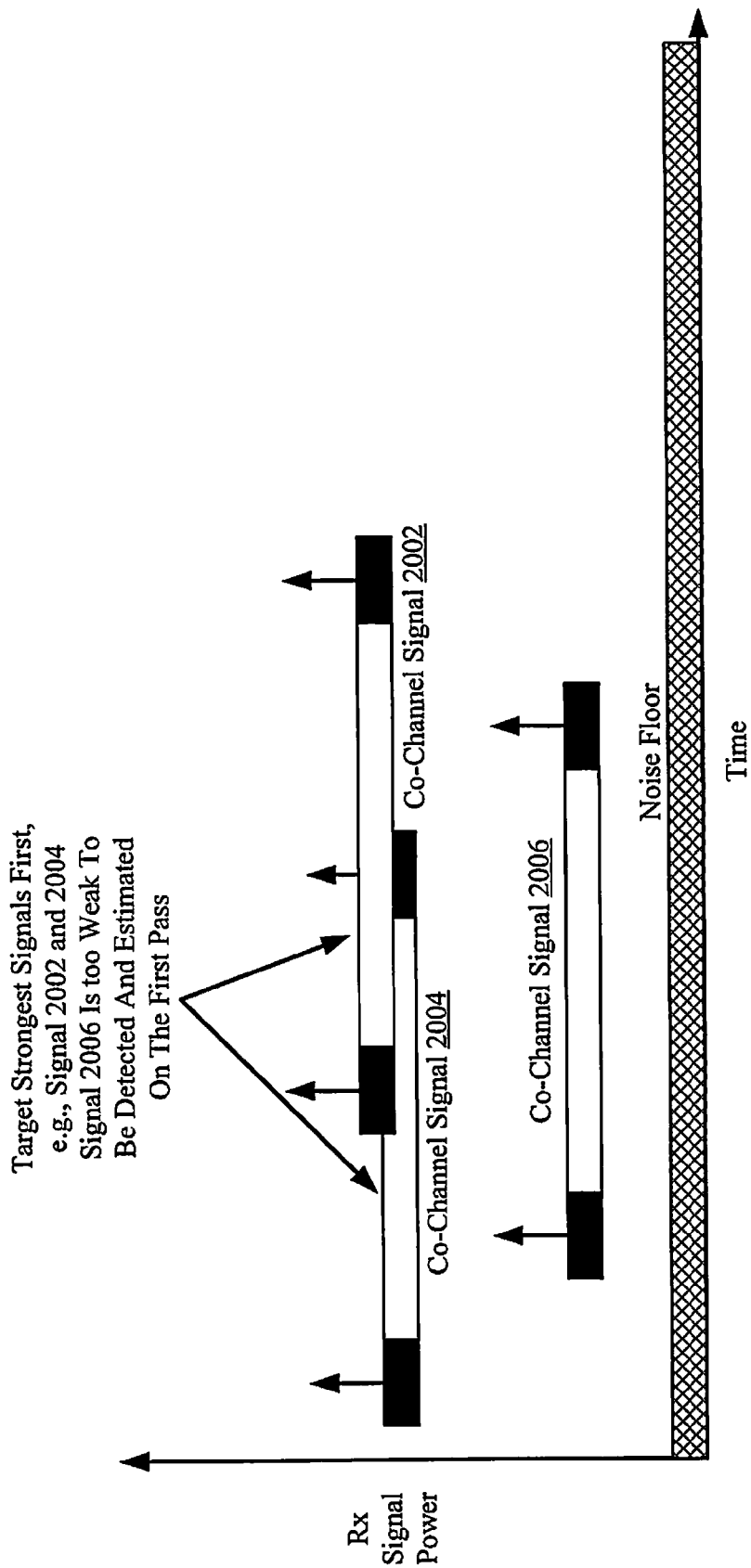
FIG. 20 is a schematic illustration that is useful for understanding the Turbo MUD processing strategy for colliding co-channel signals.

Referring now to FIG. 20, there is provided a schematic illustration that is useful for understanding a Turbo MUD processing strategy for colliding co-channel signals. In the present invention, the Turbo MUD process is iterative. Therefore, it is not necessary to recover all the co-channel signals 2002 during a first iteration of the Turbo MUD process. It is only necessary to learn more about the signals during each iteration. Notably, parameter estimation and data estimation improve each pass with the help of the FEC decoder coding gain and interference cancellation. If needed, the Turbo MUD processing can be layered. The strongest co-channel signals 2002, 2004 can be detected first. Then, the next weaker co-channel signal(s) 2006 can be detected. The layering is advantageous in these cases when the weaker signals cannot be discovered or properly detected until the stronger signals are detected and subsequently excised from the composite signal. The iterative and layered nature of the Turbo MUD processing strategy, along with the pre-amble and post-amble based signal discovery mechanism, allows for operation with a number of colliding co-channel signals with arbitrary power levels and timing offsets.

In the present invention, the Turbo MUD process employs iterative interference canceling. To recover a weaker signal 2006, the stronger co-channel signals 2002, 2004 must be subtracted from the combined co-channel signal received at the receiver. The interference cancelling is soft, meaning interference is only partially removed when the receiver is not confident of what the interference is. The confidence can vary symbol by symbol. Symbol likelihood is a measure of symbol confidence. Symbol likelihood is related to the bit likelihood values for the bits that comprise the symbol according to the modulation scheme.

Figure 21:
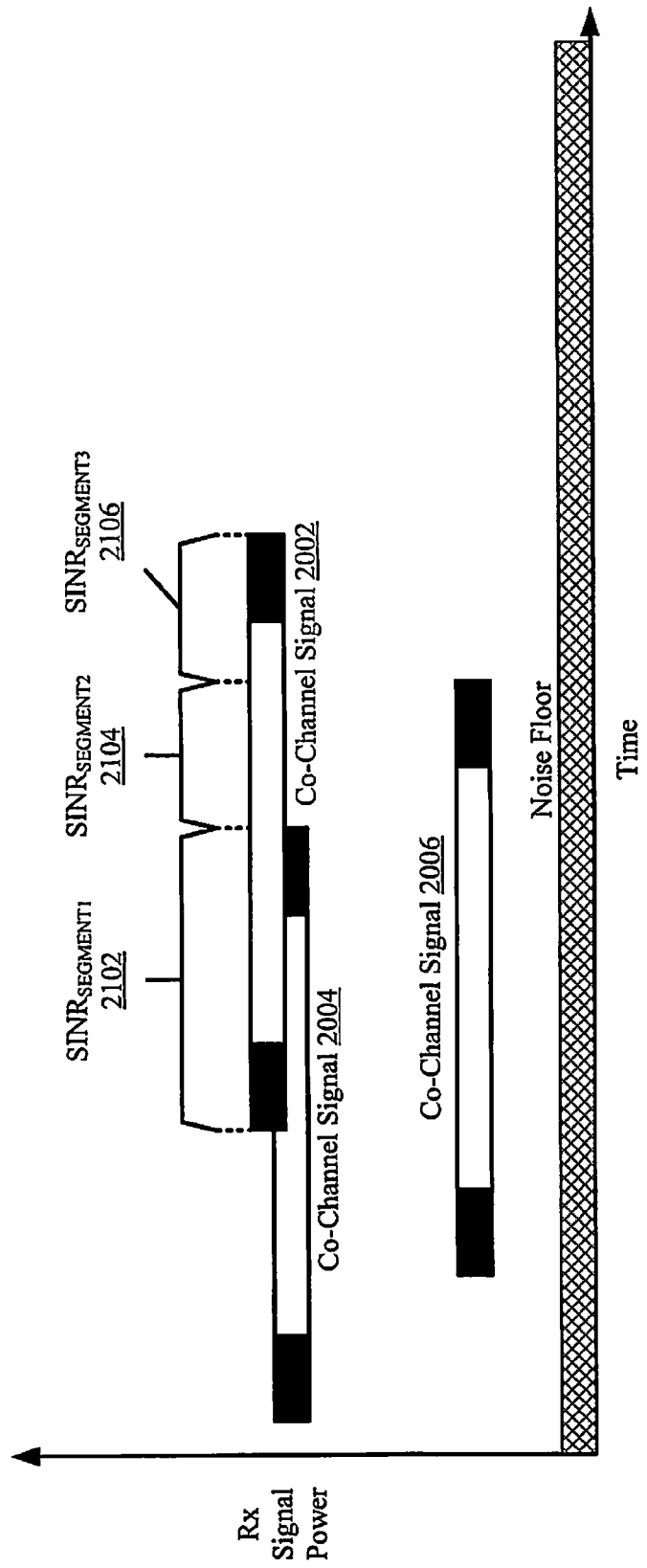
FIG. 21 is a schematic illustration that is useful for understanding Turbo MUD processing using dynamical Signal to Interference plus Noise Ratio ("SINR") segments.

Referring now to FIG. 21, there is provided a schematic illustration that is useful for understanding a Turbo MUD processing using dynamic Signal to Interference plus Noise Ratio ("SINR") segments. Notably, the Turbo MUD process described below in relation to FIG. 21 can be performed across all hops in a frequency hop scenario.

As shown in FIG. 21, co-channel signal 2002 has three distinct segments 2102, 2104, 2106. Segment 2106 is in the presence of thermal noise, but is not in collision with any co-channel signals. Segment 2104 is in the presence of thermal noise and is in collision with co-channel signal 2006. The receive signal power of co-channel signal 2006 is weak compared to that of co-channel signal 2002. As such, co-channel signal 2006 causes a relatively small amount of signal distortion to segment 2104 of co-channel signal 2002. Similarly, segment 2002 is in the presence of thermal noise and is in collision with co-channel signal 2006. Co-channel signal 2006 causes a relatively small amount of signal distortion to segment 2002. However, segment 2002 is also in collision with co-channel signal 2004. Since the RF signal power of co-channel signals 2002 and 2004 are close in value, co-channel signal 2004 causes a relatively large amount of signal distortion to segment 2102 of co-channel signal 2002.

In the present invention, the receiver detects the start and stop times of each co-channel signal 2002, 2004, 2006. The receiver can use these start and stop times to determine the overlap conditions of the co-channel signals 2002, 2004, 2006. Accordingly, the receiver can divide each co-channel signal 2002, 2004, 2006 into a plurality of segments where the SINR is unique for each segment. Thereafter, the receiver will perform bit likelihood estimations during its Turbo MUD processing of each co-channel signal 2002, 2004, 2006. The bit likelihood estimations for each co-channel signal will be segmented. In this regard, the receiver will determine a noise and interference power or variance estimate for each segment 2102, 2104, 2106.

Thereafter, all the bits in a given segment 2102, 2104, 2106 of the co-channel signal will have a bit likelihood estimate computed therefore using the respective noise and interference power or variance estimate. For example, a bit likelihood value for each bit of segment 2106 is determined using a first noise and interference power or variance estimate. The bit likelihood values for these bits indicate a relatively high confidence level since the segment 2106 is not in collision with another co-channel signal. A bit likelihood value for each bit of segment 2104 is determined using a second noise power or variance estimate. The bit likelihood values for these bits indicate a relatively lower confidence level since the segment 2104 is in collision with co-channel signal 2006. A bit likelihood value for each bit of segment 2102 is then determined using a third noise power or variance estimate. The bit likelihood values for these bits indicate an even lower confidence level since segment 2102 is in collision with co-channels signals 2004 and 2006.

Once the bit likelihood values have been computed, then the bits of co-channel signal 2002 are sent to an FEC decoder via a de-interleaver. The bit likelihood values are also sent to the FEC decoder. The FEC decoder uses the first bit likelihood values to generate a new and improved set of bit likelihood values (i.e., soft-in soft-out). During each iteration of the Turbo MUD process, the receiver's confidence level of each bit value usually increases since the previous estimate of other co-channel signal(s) are subtracted out of a combined co-channel signal prior to a next iteration of the Turbo MUD process for the co-channel signal of interest. As a result of the signal subtraction, there is usually less signal distortion experienced by segments 2102, 2104 resulting from interference with other co-channel signals. The Turbo MUD processing treats each of the individual co-channel signal(s) that comprise the composite co-channel signal as the Signal Of Interest ("SOI") in turn, with the other individual signals treated as interfering signals, as processing unfolds.

In some scenarios, the signal subtraction is performed on a symbol by symbol basis. For example, if the confidence level is relatively high for a first symbol of a co-channel signal 2004, then the interference caused thereby to co-channel signal 2004 is removed. In contrast, if the confidence level is relatively low for a second symbol of co-channel signal 2004, then the interference caused thereby to co-channel signal 2004 is not removed. As noted above, the bit (hence symbol) confidence levels are usually improved during each iteration of the Turbo MUD process. Accordingly, signal interference is usually further reduced from the co-channel signal 2004 during each subsequent iteration of the Turbo MUD process.

Exemplary Multi-User Receiver Architecture

Figure 22:
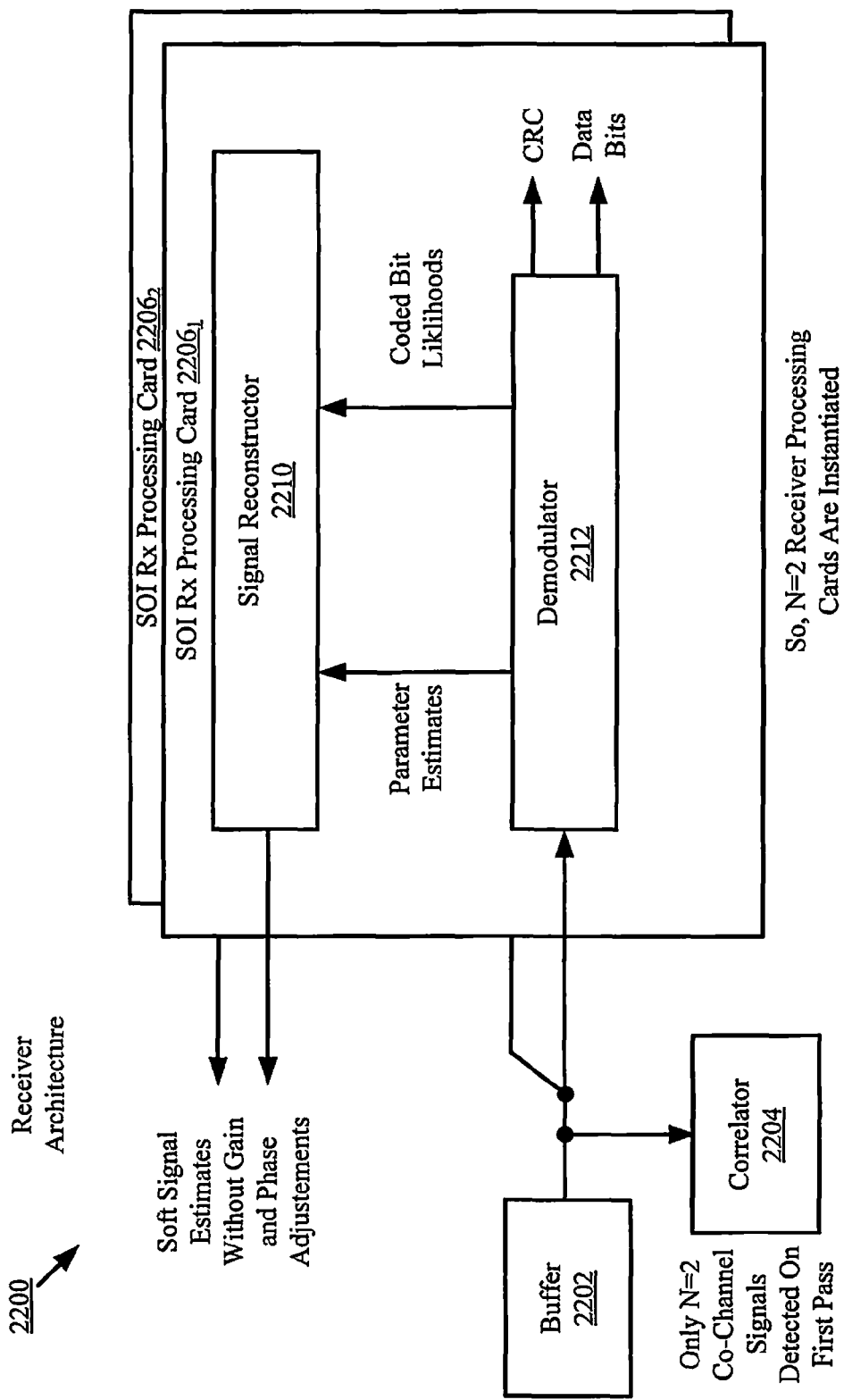
FIG. 22 is a block diagram of an exemplary architecture for a receiver performing a first pass of a Turbo MUD process in accordance with the present invention.

Referring now to FIG. 22, there is provided a block diagram of an exemplary architecture for a receiver 2200 performing a first pass of a Turbo MUD process in accordance with the present invention. As shown in FIG. 22, the receiver 2200 comprises a buffer 2202, a signal discovery correlator 2204 and a plurality of SOI RX processing cards $2206_1$, $2206_2$. During operation, the receiver 2200 stores samples of a combined co-channel signal in buffer 2202. The buffer samples are a dynamic mixture of noise and multiple signals. The buffer 2200 allows the receiver 2200 to perform an iterative decoding process of each colliding co-channel signal. In this regard, the colliding co-channel signals stored in buffer 2200 are processed during each iteration of the respective decoding process. In some scenarios, the co-channel signals are frequency hop signals.

The samples stored in buffer 2202 are then used by signal discovery correlator 2204 to detect one or more co-channel signals. The signal discovery correlator 2204 operates in the same or similar manner as that described above in relation to the single user case, i.e., it detects the start time and stop time of each co-channel signal. In the embodiment shown in FIG. 22, two co-channel signals are detected in a first iteration of the Turbo MUD process. Accordingly, the receiver 2200 logically creates two SOI RX processing cards $2206_1$, $2206_2$, one for each detected co-channel signal. In the more general case, N co-channel signals could be detected in a first iteration in which case the receiver 2200 logically creates N SOI RX processing cards, one for each detected co-channel signal.

Each processing card $2206_1$, $2206_2$ comprises a demodulator 2212 and signal reconstructor 2210. The demodulator 2212 of processing card $2206_1$ attempts to demodulate a first one of the two identified co-channel signals. Similarly, the demodulator of processing card $2206_2$ attempts to demodulate a second one of the two identified co-channel signals. The demodulators 2212 perform some of the same or similar operations to that described above in relation to the single user case. More specifically, each demodulator 2212 processes the samples of the combined co-channel signal containing the respective identified co-channel signal. This processing includes: removing a frequency offset; performing match filtering operations; bit likelihood computations; and FEC decoding. The operations of demodulator 2212 will be described in more detail below in relation to FIG. 25.

After the demodulator 2212 completes its processing, the signal reconstructor 2210 attempts to reconstruct an ideal copy of the transmitted co-channel signal. The manner in which the transmitted co-channel signal is reconstructed will be described in detail below in relation to FIG. 27. Still, it should be noted that the reconstructed signal can be generated based on symbol likelihood values, which are determined from the bit likelihood values. In subsequent iterations of the Turbo MUD process, the reconstructed signal is used to remove interference caused thereby to other co-channel signals. As a result, the subsequent demodulation and reconstruction processes have an improved performance during the subsequent iteration thereof.

Figure 23:
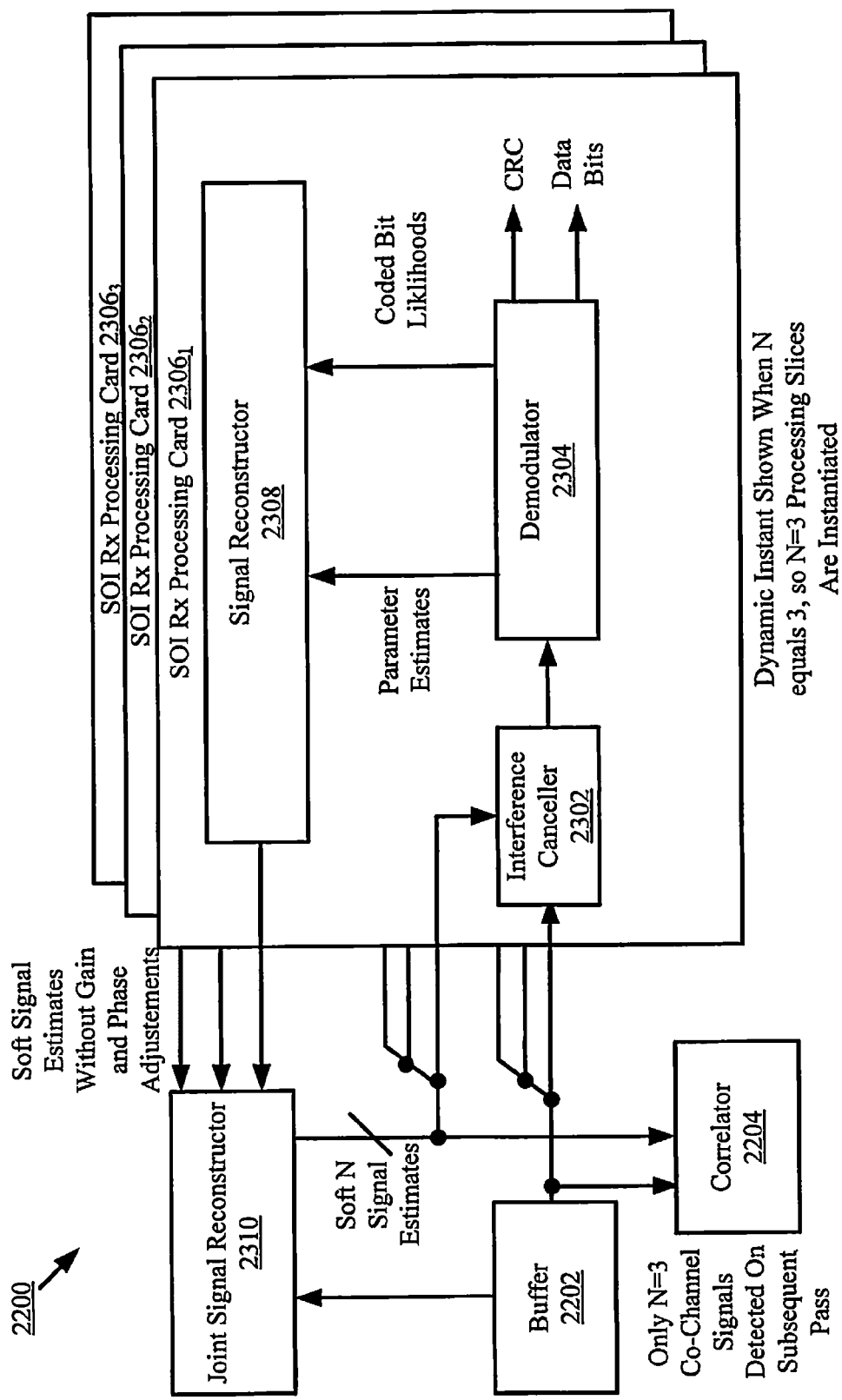
FIG. 23 is a block diagram of an exemplary architecture for a receiver performing a subsequent pass of a Turbo MUD process in accordance with the present invention.

Referring now to FIG. 23, there is provided a block diagram of an exemplary architecture for the receiver 2200 performing a subsequent pass (e.g., a second or third pass) of a Turbo MUD process in accordance with the present invention. The receiver 2200 is able to discover additional users or co-channel signals in subsequent passes. In this regard, the receiver 2200 subtracts the interference caused by the previously detected signals from the combined co-channel signal output from buffer 2202. Thereafter, the receiver 2200 performs correlation operations using the resulting signal with the interference removed therefrom. During the correlation operations, the receiver 2200 detects co-channel signals that are weaker than those co-channel signals previously detected. Every time a new co-channel signal is detected, the receiver 2200 increments a count of the number of users that have been discovered. For example, if two users or two co-channel signals were detected on a first pass, then N=2. If an additional user or co-channel signal is detected during a second pass, then the value of N is incremented to N=3.

Thereafter, N logical SOI RX processing cards are required, one for each discovered co-channel signal. In the above example, three SOI RX processing cards $2306_1$, $2306_2$, $2306_3$ are required. Each processing card $2306_1$, $2306_2$, $2306_3$ is dedicated to one of the co-channel signals which was detected during the correlation operations. Each SOI RX processing card treats its dedicated individual co-channel signal as the SOI, while treating the other individual signals as interference. As shown in FIG. 23, each processing card $2306_1$, $2306_2$, $2306_3$ comprises an interference canceller 2302, a demodulator 2304, and a signal reconstructor 2308. The interference canceller 2302 cancels the interference from all other detected user or co-channel signals, except for the co-channel signal to which the processing card is dedicated, which is the SOI for that processing card. For example, if N=3, then the three processing cards $2306_1$, $2306_2$, $2306_3$ are required. The first processing card $2306_1$ is dedicated to a first co-channel SOI, and therefore cancels the interference caused to the first co-channel SOI from a second co-channel signal and a third co-channel signal. The second processing card $2306_2$ is dedicated to the second co-channel SOI, and thus cancels interference caused to the second co-channel SOI by the first co-channel signal and the third co-channel signal. Similarly, the third processing card $2306_3$ is dedicated to a third co-channel SOI, and cancels interference caused to the third co-channel SOI by the first co-channel signal and the second co-channel signal. Embodiments of the present are not limited to the particularities of the example where N=3. Also, techniques for canceling signal interference are well known in the art. Any known or to be known interference cancelation technique can be used with the present invention without limitation. In some scenarios, a simple signal subtraction technique can be employed to remove interference from a co-channel SOI.

Once the interference has been removed by the interference canceller 2302, demodulation operations are performed thereon by demodulator 2304 for its SOI. The output of the demodulator 2304 is then passed to the signal reconstructor 2308. Demodulator 2304 is the same as or similar to demodulator 2212 of FIG. 22. Likewise, signal reconstructor 2308 is the same as or similar to the signal reconstructor 2210 of FIG. 22. Thus, the discussion provided above in relation to components 2210, 2212 is sufficient for understanding the operations of the demodulator 2304 and signal reconstructor 2308. Still, it should be noted that the signal reconstructor 2308 reconstructs the samples of the co-channel SOI based on the demodulator 2304 output for its SOI, but without knowledge of their amplitude and carrier phase. Therefore, additional operations are performed to reconstruct the amplitude and carrier phase of the co-channel SOI. In this regard, the output of the signal reconstructor 2308 comprises soft signal estimates without gain and phase adjustments. The soft signal estimates are then forwarded to a joint signal reconstructor 2310.

At the joint signal reconstructor 2310, a mathematical estimation technique is employed to jointly estimate the amplitude and carrier phase of all the detected co-channel signals. If the amplitude and carrier phase are jointly estimated, then the accuracy of such estimations is of a relatively high degree. The mathematical estimation technique generally involves a Least Squares Estimation which is a linear algebra technique. Once the amplitude and carrier phase has been determined, the N soft signal estimates are modified to produce N soft signal estimates with the determined gain and carrier phase. The N soft signal estimates are then forwarded to the signal discovery correlator 2204 and interference canceller 2302 for use in the interference subtraction operations described above. Notably, the effectiveness of the interference subtraction operations usually increases on each pass or iteration of the Turbo MUD processing.

Figure 24:
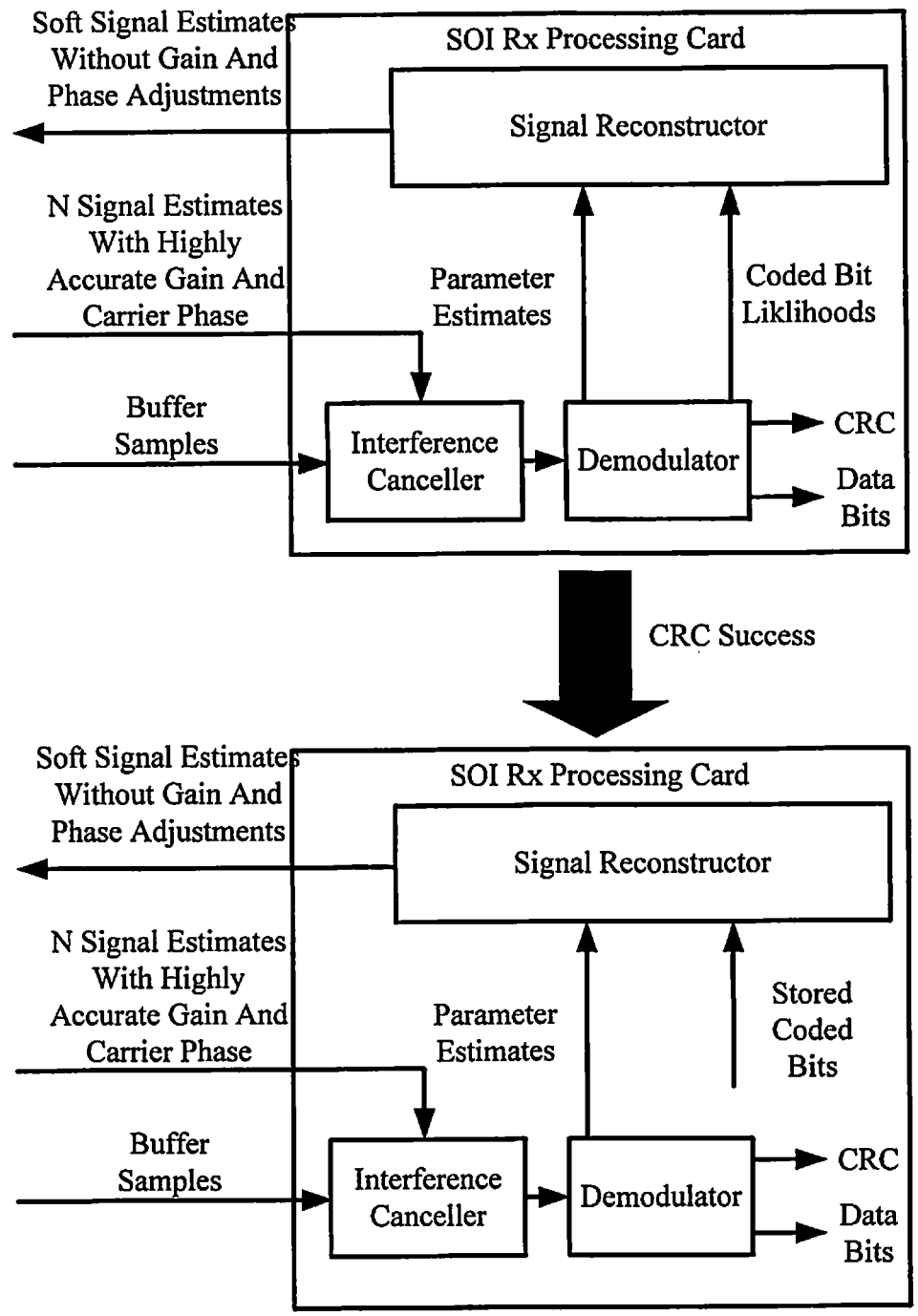
FIG. 24 is a schematic illustration that is useful in understanding what happens when a receiver successfully recovers the bits of a detected co-channels signal.

Referring now to FIG. 24, there is provided a schematic illustration that is useful in understanding what happens when a receiver successfully recovers the bits of a detected co-channel signal. Once a CRC test succeeds, the data is known for the respective co-channel signal. Accordingly, no more data detection is needed for this co-channel signal. As such, the data is stored in a data store for use in all subsequent Turbo iterations, as shown in FIG. 24. The reason that the processing card continues to Turbo iterate is that the CRC'd signal still acts as interference to other signals. Therefore, the co-channel signal will continue to be used to eliminate interference caused thereby to the other detected co-channel signals for which a successful CRC test has not been performed. Since the associated parameter estimates are not perfect (e.g., amplitude, timing, carrier phase, and frequency offset), the ability to eliminate interference caused by the known co-channel signal is limited to the parameter accuracy. So, during each pass of the Turbo MUD process, the parameters are estimated by the demodulator afresh with increasing accuracy. This allows the signal to be reconstructed and interference to be cancelled more precisely with further Turbo iterations. Strong interference must be suppressed many dB to discover and receive weak co-channel signals.

Figure 25:
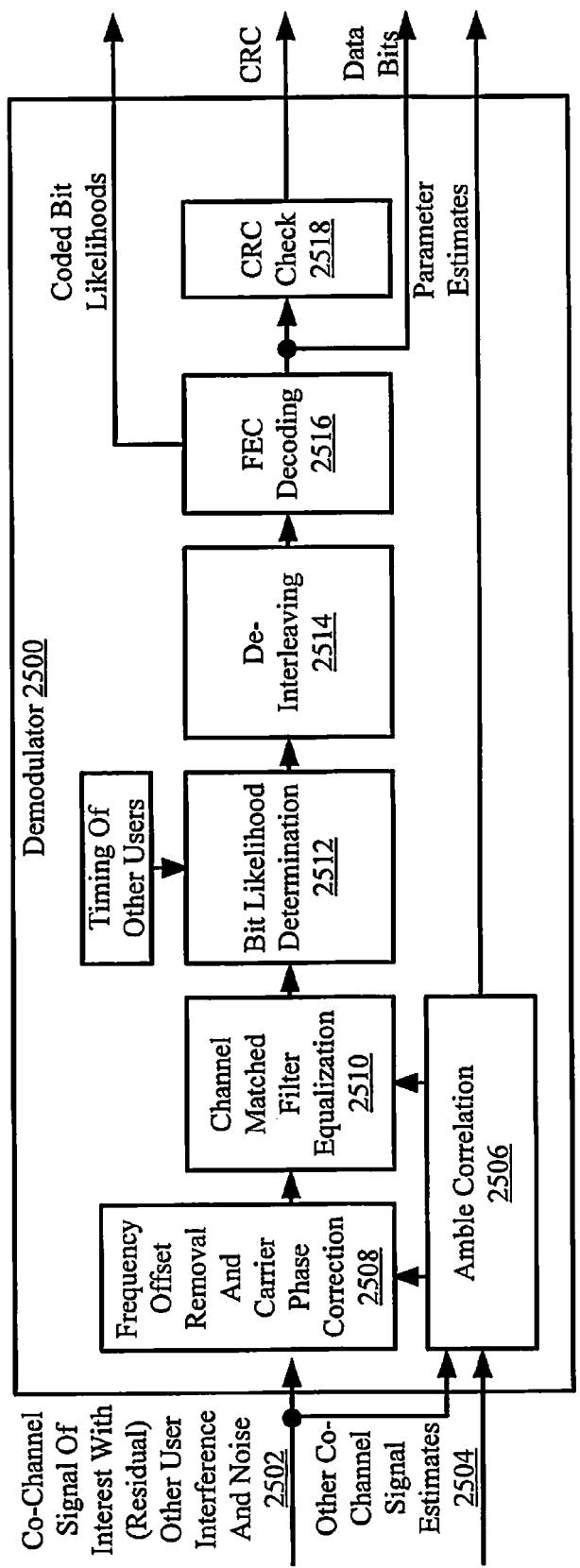
FIG. 25 is a block diagram of an exemplary demodulator.

Referring now to FIG. 25, there is provided a more detailed block diagram of an exemplary demodulator 2500. Demodulator 2212 of FIG. 22 and demodulator 2304 of FIG. 23 are the same as or similar to demodulator 2500. As such, the discussion provided herein in relation to demodulator 2500 is sufficient for understanding demodulators 2212, 2304.

As shown in FIG. 25, demodulator 2500 is configured to receive the co-channel signal of interest 2502 and the other detected co-channel signal estimates 2504. Co-channel signal 2502 has other user interference and noise. As such, amble correlation 2506 is performed for each co-channel signal to estimate the amplitude, fine sample timing, carrier phase and frequency offset. Also, a new matched filter is selected or designed based on the results of the amble correlation for its co-channel SOI, as described above in relation to the single user case. In block 2508, the frequency offset is removed and the carrier phase is corrected. Thereafter, in block 2510, matched filtering for the co-channel SOI is performed on the output of block 2508. In a next block 2512, bit likelihood values are computed for each SINR segment of the co-channel signal of interest, as described above in relation to FIG. 21 and described below in relation to FIG. 26. Following the operations of block 2512, various other signal processing operations are performed for the co-channel SOI, such as de-interleaving in block 2514, FEC decoding in block 2516 and CRC checking in block 2518. The operations of blocks 2514, 2516, 2518 are the same as or substantially similar to that of blocks 1016, 1018, 1020 of FIG. 10, respectively. As such, the discussion provided above in relation to blocks 1016, 1018, 1020 is sufficient for understanding the operations of blocks 2514, 2516, 2518.

Figure 26:
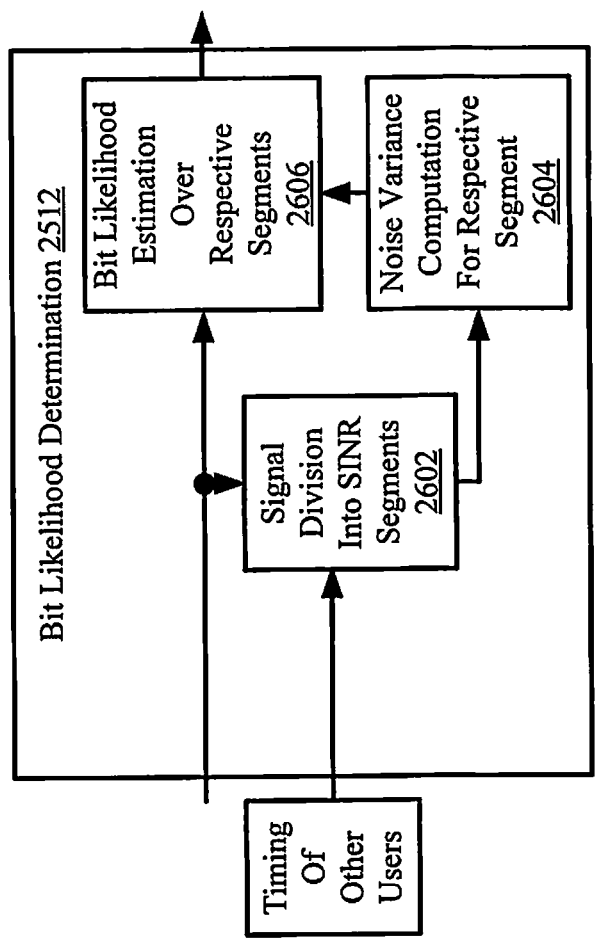
FIG. 26 is a block diagram that is useful for understanding how a bit likelihood determination is made by the demodulator of FIG. 25.

Referring now to FIG. 26, there is provided a block diagram that is useful for understanding how a bit likelihood determination is made in block 2512 by demodulator 2500. As shown in FIG. 26, block 2512 is configured to divide the co-channel signal of interest into a plurality of SINR segments (e.g., SINR segments 2102-2106 of FIG. 21), as shown by block 2602 of FIG. 26. This signal segmentation is achieved using timing of other users or co-channel signals (i.e., start and stop times). Next, a noise and interference power or variance is computed for each SINR segment in block 2604. The noise and interference power or variance values are then used to determine bit likelihood estimations over respective segments, as shown by block 2606. The bit likelihood estimations are determined in the same or similar manner to that described above in relation to the single user case (e.g., block 1014 of FIG. 10). Where SINR is high (low), bit estimation confidence will be high (low).

Figure 27:
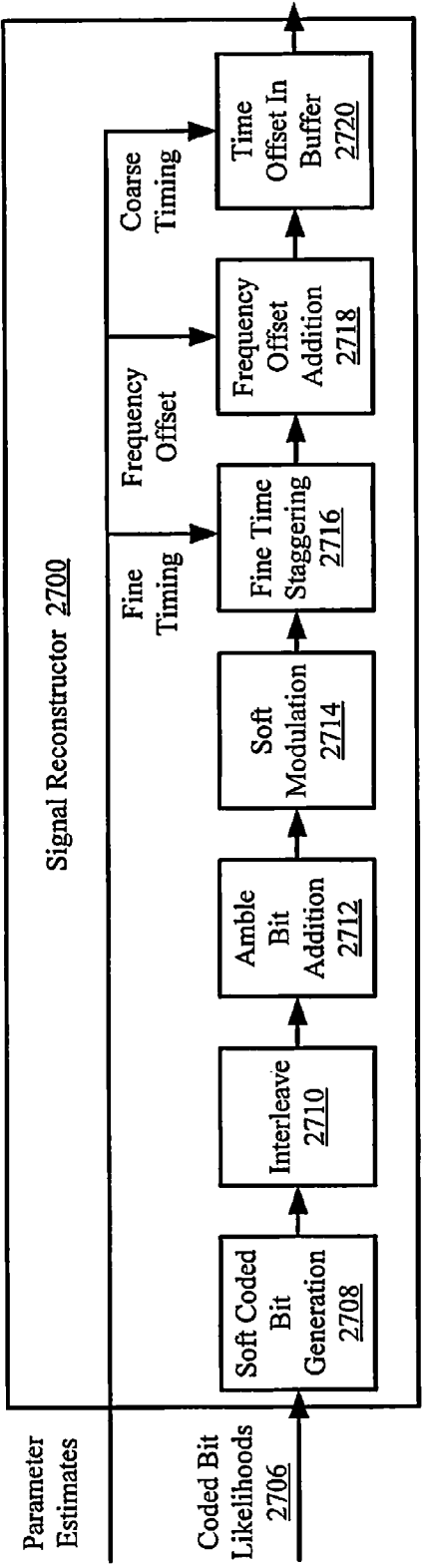
FIG. 27 is a block diagram that is useful for understanding how soft signal estimates are generated by a signal reconstructor of a Signal Of Interest ("SOI") Rx processing card when a successful CRC check has not yet occurred.

Referring now to FIG. 27, there is provided a block diagram that is useful for understanding how soft signal estimates are generated by a signal reconstructor 2700 of a SOI RX processing card (e.g., processing card 2210 of FIG. 22, processing card 2206$_1$, 2206$_2$ of FIG. 22 or processing card 2306$_1$, 2306$_2$, 2306$_3$ of FIG. 23) when a successful CRC check has not yet occurred. As shown in FIG. 27, the signal reconstructor 2700 is generally configured to perform similar operations performed by a transmitter. In this regard, the reconstructor 2700 converts the coded bit likelihood values into soft coded bits in block 2708. The soft coded bits have a mathematical property that is optimal.

Figure 29:
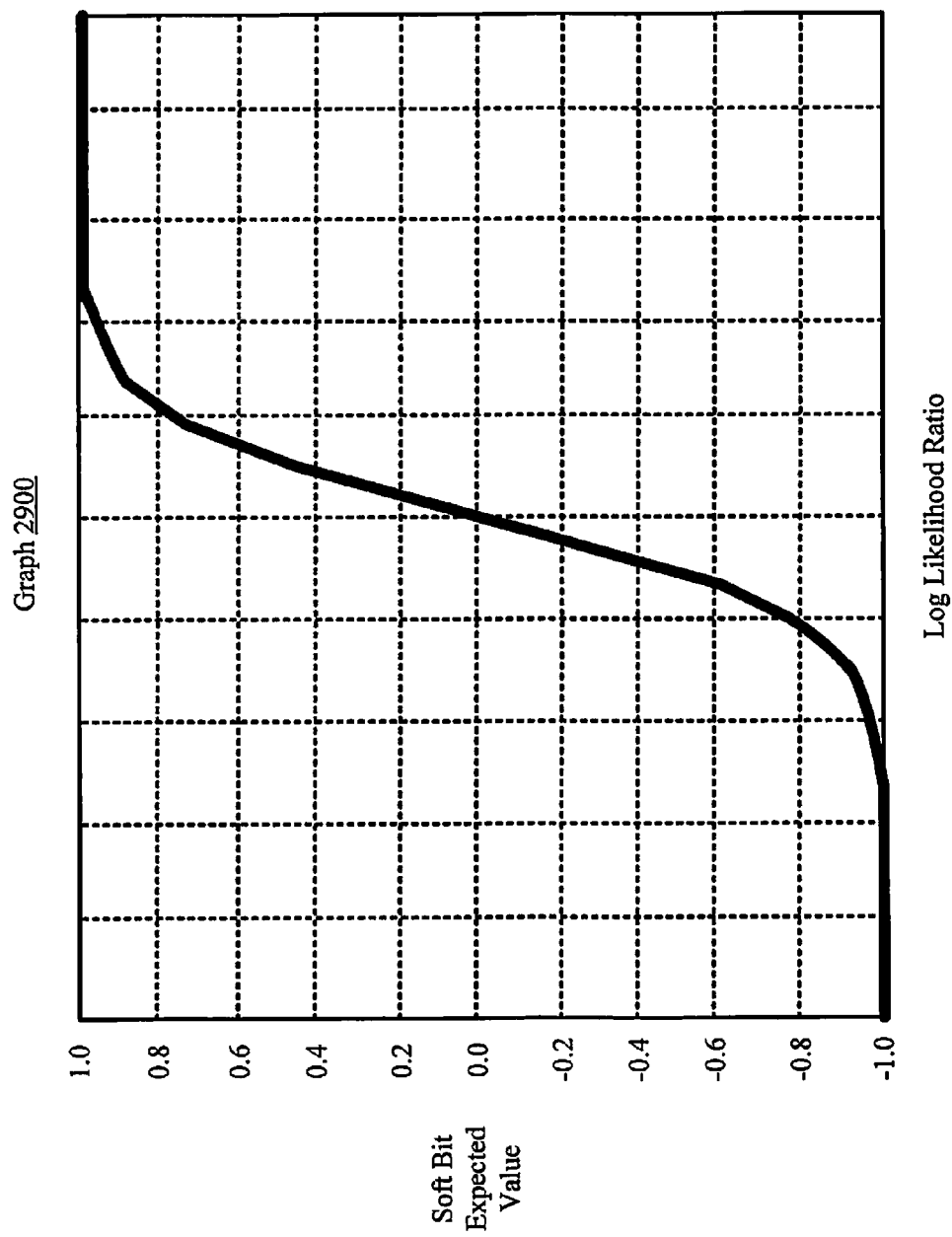
FIG. 29 is a graph plotting soft bit expected values versus log likelihood ratios.

The conversion operations of block 2708 will now be described in more detail in relation to a graph 2900 of FIG. 29. Graph 2900 plots soft bit expected values versus log likelihood ratios, an approximation of the equation b=tan h(γ/2), where b is the soft bit and γ is the log likelihood ratio. As shown by graph 2900, if the bit likelihood has a value of zero, then the soft reconstructed bit value is set equal to zero. If the bit likelihood has a value of positive eight, then the soft reconstructed bit value is set equal to a positive one. If the bit likelihood has a value of negative eight, then the soft reconstructed bit value is set equal to a negative one, and so on. Accordingly, the signal reconstructor 2700 is converting the bit likelihood values to soft bit expected values, i.e., the expected value of the bit symbol at a given point in time, where a bit symbol with a positive value may represent a bit with a value of 1, and a bit symbol with a negative value may represent a bit with a value of 0.

Referring again to FIG. 27, the bits are shuffled in block 2710 so as to create a more uniform distribution of errors. Soft modulation is then performed in block 2714 using the shuffled bits to produce soft symbol samples. The soft modulation can include, but is not limited to, BPSK, GSM like GMSK or QPSK. The output of block 2714 is passed to block 2716. Notably, blocks 2716-2720 are provided for purposes of matching certain characteristics of the modulated soft symbol samples with those of the samples stored in a buffer (e.g., buffer 2202 of FIGS. 22-23). Accordingly, fine time staggering is achieved in block 2716. A frequency offset is then added in block 2718. In block 2720, all sample timing is coarsely adjusted to match the timing of the corresponding samples stored in the buffer (i.e., such that the start/stop time of the co-channel signal of interest matches that of the respective co-channel signal contained in the combined co-channel signal stored in the buffer).

Figure 28:
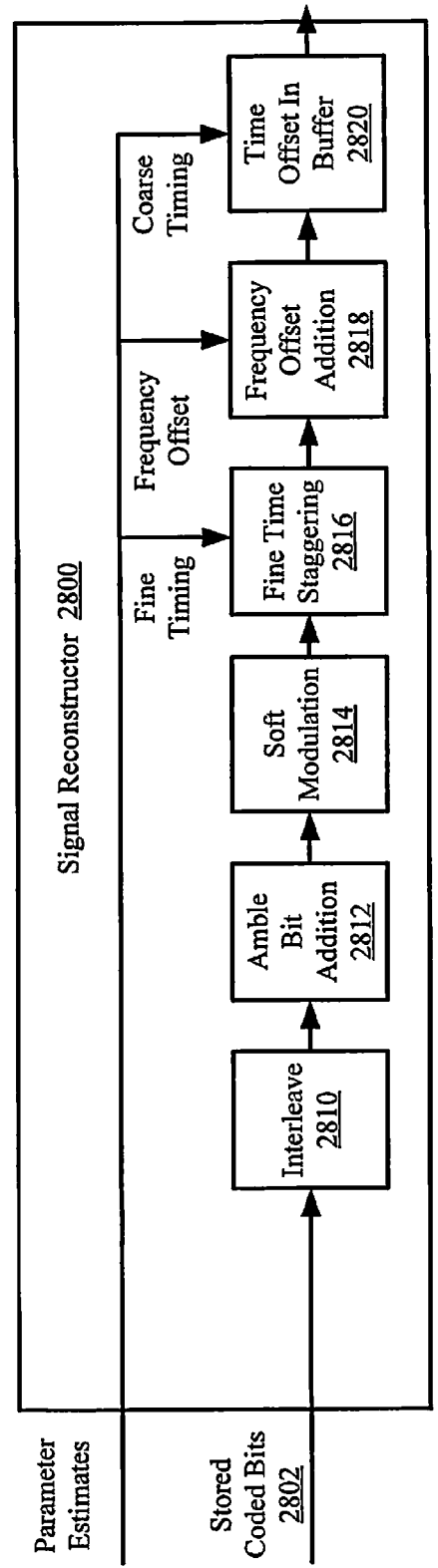
FIG. 28 is a block diagram that is useful for understanding how signal estimates are generated by a signal reconstructor of an SOI Rx processing card when a successful CRC check has occurred.

Referring now to FIG. 28, there is provided a block diagram that is useful for understanding how signal estimates are generated by a signal reconstructor 2800 of an SOI RX processing card (e.g., processing card 2210 of FIG. 22, processing card 2206$_1$, 2206$_2$ of FIG. 22 or processing card 2306$_1$, 2306$_2$, 2306$_3$ of FIG. 23) when a successful CRC check has occurred, so that the detected coded bits are known with near certainty and are represented and stored with an arithmetic value of one (for bit=1) or negative one (for bit=0). As shown in FIG. 28, the signal reconstructor 2800 is configured to receive stored coded bits 2802. Each coded bit 2802 comprises a hard bit with a value of one or negative one. Bit confidence is not used by signal reconstructor 2800 because the CRC check was successful, and therefore the receiver is very confident that the values of coded bits 2802 are correct. The coded bits 2802 are then processed in blocks 2810-2820. The operations of blocks 2810-2820 are the same as or similar to those of blocks 2710-2720 of FIG. 27. As such, the discussion provided above in relation to blocks 2710-2720 is sufficient for understanding blocks 2810-2820.

Figure 30:
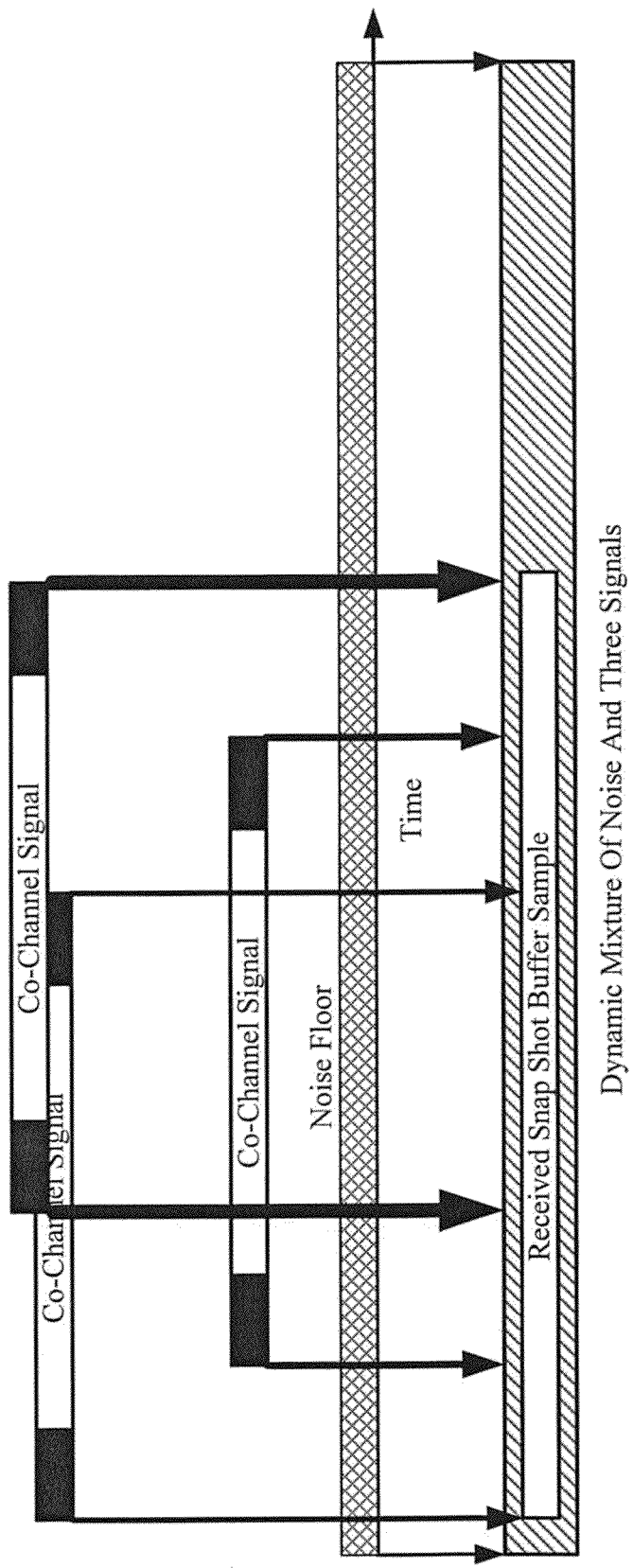
FIGS. 30-31 provide schematic illustrations that are useful for understanding joint amplitude and carrier phase estimation operations performed by a joint signal reconstructor of a Turbo MUD processor.

Referring now to FIG. 30, there is provided a schematic illustration that is useful for understanding a joint amplitude and carrier phase estimation performed by a joint signal reconstructor (e.g., joint signal reconstructor 2310 of FIG. 23). As shown in FIG. 30, the buffer samples comprise a mixture of noise and co-channel signals. The co-channel signals are shifted left or right in the buffer depending upon their start times. The input into the joint signal reconstructor comprises estimates of the reconstructed co-channel signals. The estimates of the reconstructed signals are then compared to the samples stored in the buffer for purposes of jointly determining optimal estimates for amplitude and carrier phase. The unknown amplitude and carrier phase for each co-channel signal is equal to an unknown complex constant. The unknown constant is defined by the following mathematical equation (6).

$$C = Ae^{j\theta} = a + j*b \tag{6}$$

where C represents the unknown complex constant specifying the amplitude and carrier phase of a co-channel signal. a represents a real component of the complex constant C. b represents an imaginary component of the complex constant C.

Figure 31:
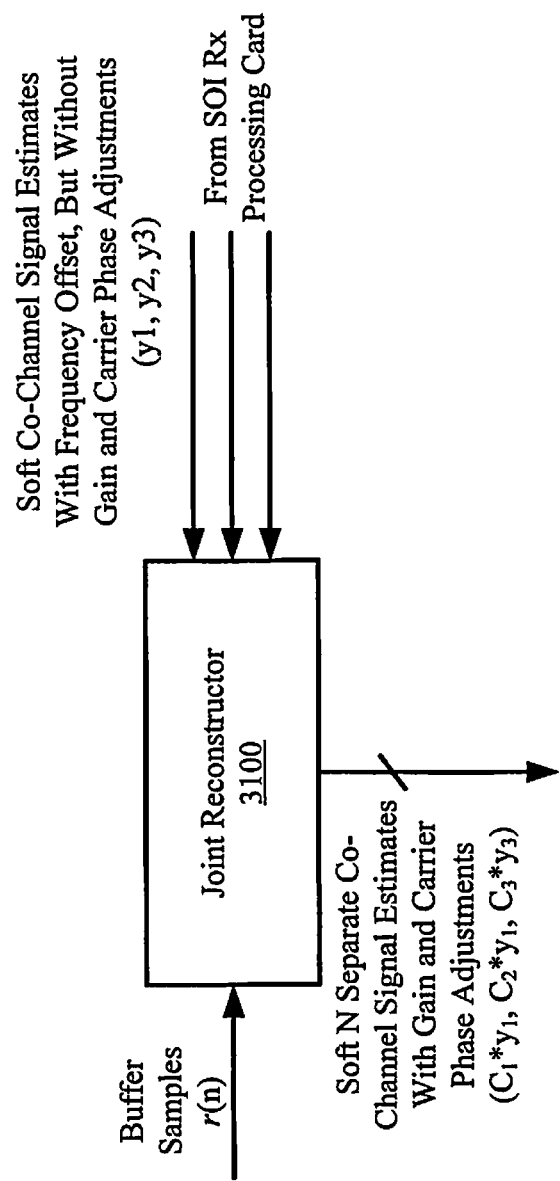

The complex constant for the co-channel signals can be jointly solved using simple matrix algebra. As an example, for three signals, a matrix inverse is computed for a 3×3 matrix. An example of such a 3×3 matrix will now be described in relation to FIG. 31. As shown in FIG. 31, a joint reconstructor 3100 processes buffer samples r(n) and soft co-channel signal estimates $y_1$, $y_2$, $y_3$ to generate 3 modified soft co-channel signal estimates with gain and carrier phase adjustments $C_1*y_1$, $C_2*y_2$, $C_3*y_3$. The buffer samples r(n) are defined by the following mathematical equation (7).

$$r(n) = \sum_{i=1}^{3} C_i y_i(n) + v(n) \quad (7)$$

where $C_i$ represents a complex constant. $y_i(n)$ represents a reconstructed soft co-channel signal estimate. v(n) represents noise. Notably, mathematical equation (7) shows that the value of i is 1, 2 or 3 indicating that three users or co-channel signals were previously detected. The value of i is not limited in this regard, and can in principle have any integer value in accordance with how many users or co-channel signals have been previously detected. The values of the complex constants $C_i$ in a three user case can be computed by solving the following matrix equation (8).

$$\begin{bmatrix} y_1(1) & y_2(1) & y_3(1) \\ y_1(2) & y_2(2) & y_3(2) \\ \vdots & \vdots & \vdots \\ y_1(M) & y_2(M) & y_3(M) \end{bmatrix} \begin{bmatrix} C_1 \\ C_2 \\ C_3 \end{bmatrix} = \begin{bmatrix} r(1) \\ r(2) \\ \vdots \\ r(M) \end{bmatrix} \quad (8)$$

where at least a portion of $y_1(1), y_1(2), \ldots, y_1(M)$ in the first column of the M×3 matrix represent the reconstructed samples output from a first SOI RX processing card. At least a portion of $y_2(1), y_2(2), \ldots, y_2(M)$ in the second column of the M×3 matrix represent the reconstructed samples output from a second SOI RX processing card. At least a portion of $y_3(1), y_3(2), \ldots, y_3(M)$ in a third column of the M×3 matrix represent the reconstructed samples output from a third SOI RX processing card. Any remaining values of $y_1(1), y_1(2), \ldots, y_1(M), y_2(1), y_2(2), \ldots, y_2(M), y_3(1), y_3(2), \ldots, y_3(M)$ are set to zero, i.e., the samples before a co-channel signal begins or after a co-channel signal ends are set to zero so as to provide the same staggering of the co-channel signals relative to that of the buffer samples. $C_1$ represents a complex constant for a first co-channel signal. $C_2$ represents a complex constant for a second co-channel signal. $C_3$ represents a complex constant for a third co-channel signal. The vector including $C_1, C_2, C_3$ is a 3×1 vector. $r(1), r(2), \ldots, r(M)$ represent the samples stored in a buffer. M can be any integer value. The vector including $r(1), r(2), \ldots, r(M)$ is an M×1 vector.

Mathematical equation (8) can be rewritten as mathematical equation (9).

$$Yc = r \quad (9)$$

where Y represents the M×3 matrix of mathematical equation (8). c represents the 3×1 vector of mathematical equation (8). r represents the M×1 vector of mathematical equation (8). For the three co-channel signal case, the solution is obtained with a 3×3 matrix inverse, even if the number of buffer samples M is relatively large (e.g., 500). In this regard, mathematical equation (9) can be rewritten as mathematical equation (10).

$$(Y^H Y)c = (Y^H r) \quad (10)$$

where $Y^H$ represents a conjugate transpose of the M×3 matrix Y. Mathematical equation (10) can be rewritten as mathematical equation (11).

$$Rc = d \quad (11)$$

where R represents $Y^H Y$, i.e., the correlation matrix of three users or co-channel signals. d represents $Y^H r$. R is a 3×3 matrix, c is a 3×1 vector and d is a 3×1 vector. As such, c can be solved in accordance with the following relatively simple mathematical equation (12).

$$c = R^{-1} d \quad (12)$$

where $R^{-1}$ represents the inverse of matrix R. Inverting a 3×3 matrix is relatively straightforward and computationally easy. One skilled in the art may recognize that there are a number of methods for estimating c in mathematical equation (10).

Referring now to FIGS. 32-33, there is provided schematic illustrations that are useful for understanding how soft symbols (bits) can be used for soft symbol modulation (e.g., block 2714 of FIG. 27 or block 2814 of FIG. 28) of a signal reconstructor (e.g., signal reconstructor 2700 of FIG. 27 or 2800 of FIG. 28). FIG. 32 provides an exemplary hard symbol (bit) modulator and an exemplary soft symbol (bit) modulator for BPSK. FIG. 33 provides an exemplary hard symbol (bit) modulator and an exemplary soft symbol (bit) modulator for QPSK.

In the BPSK scenario, the hard bit modulator, for example, represents a bit value of one as positive one and a bit value of zero as a minus one. When the ones and zeros are to be transmitted, the hard bit modulator sends impulses, each having an amplitude of plus one or minus one, through a pulse shaping filter to synthesize a waveform to be transmitted. The waveform is then converted onto an RF carrier and transmitted from an antenna element.

However, in the Turbo MUD process of the present invention, bit and symbol confidence information is used. Therefore, in the present invention, the co-channel signals are reconstructed using optimal bit and symbol confidence information. Symbol confidence information can be derived based on knowledge of all bit confidence information for the bits that comprise the symbol, which is a particularly trivial operation for the case of modulations that utilize one coded bit per symbol. The signal reconstruction is achieved by creating impulses having magnitudes proportional to the symbol confidence levels thereof, respectively. In some scenarios, an impulse magnitude is equal to a respective symbol's expected value. In Turbo MUD, soft reconstruction is important for soft interference cancelation. An interference symbol will be confidently subtracted when the risk is very low that it is wrong. Or, an interference symbol will be weakly subtracted when the risk is high that it is wrong.

In the QPSK scenario, the hard symbol (bit) modulator represents a first bit per symbol as an imaginary component of an impulse having a magnitude of plus or minus one, and a second bit per symbol as a real component of an impulse having a magnitude of plus or minus j. The impulses are sent through a pulse shaping filter to synthesize a waveform to be transmitted. The waveform is then converted onto an RF carrier and transmitted from an antenna element.

However, in the Turbo MUD process of the present invention, bit and symbol confidence information is used. Therefore, in the present invention, the co-channel signals are reconstructed using optimal bit and symbol confidence information. This signal reconstruction is achieved by creating impulses having complex magnitudes proportional to the symbol confidence levels thereof, respectively.

Figure 34:
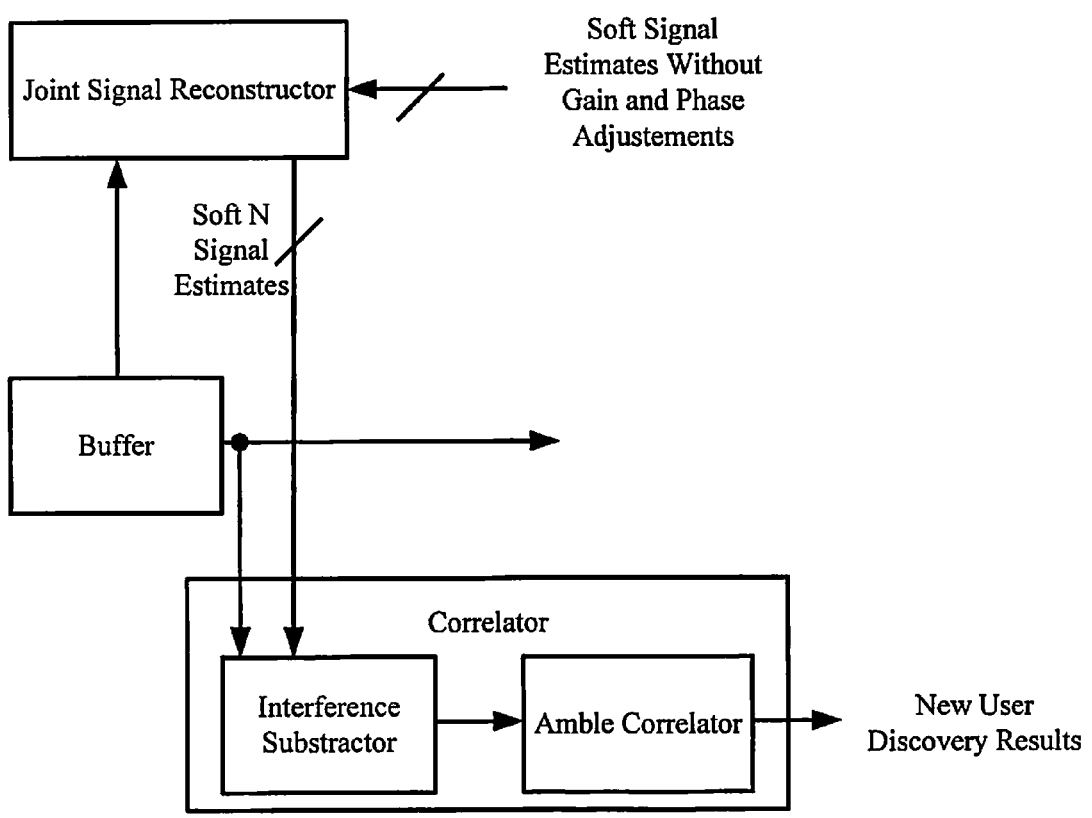
FIG. 34 is a block diagram that is useful for understanding the correlation operations performed in a receiver.

Referring now to FIG. 34, there is provided a block diagram that is useful for understanding the correlation operations of a correlator (e.g., signal discovery correlator 2204 of FIGS. 22-23) of a receiver (e.g., receiver 2200 of FIGS. 22-23). As noted above, new weaker co-channel signals can be discovered by subtracting the interference caused by all known existing N user signals. After the interference has been removed, then the remaining signal is used for amble correlation to detect any new weaker co-channel signals.

Figure 35:
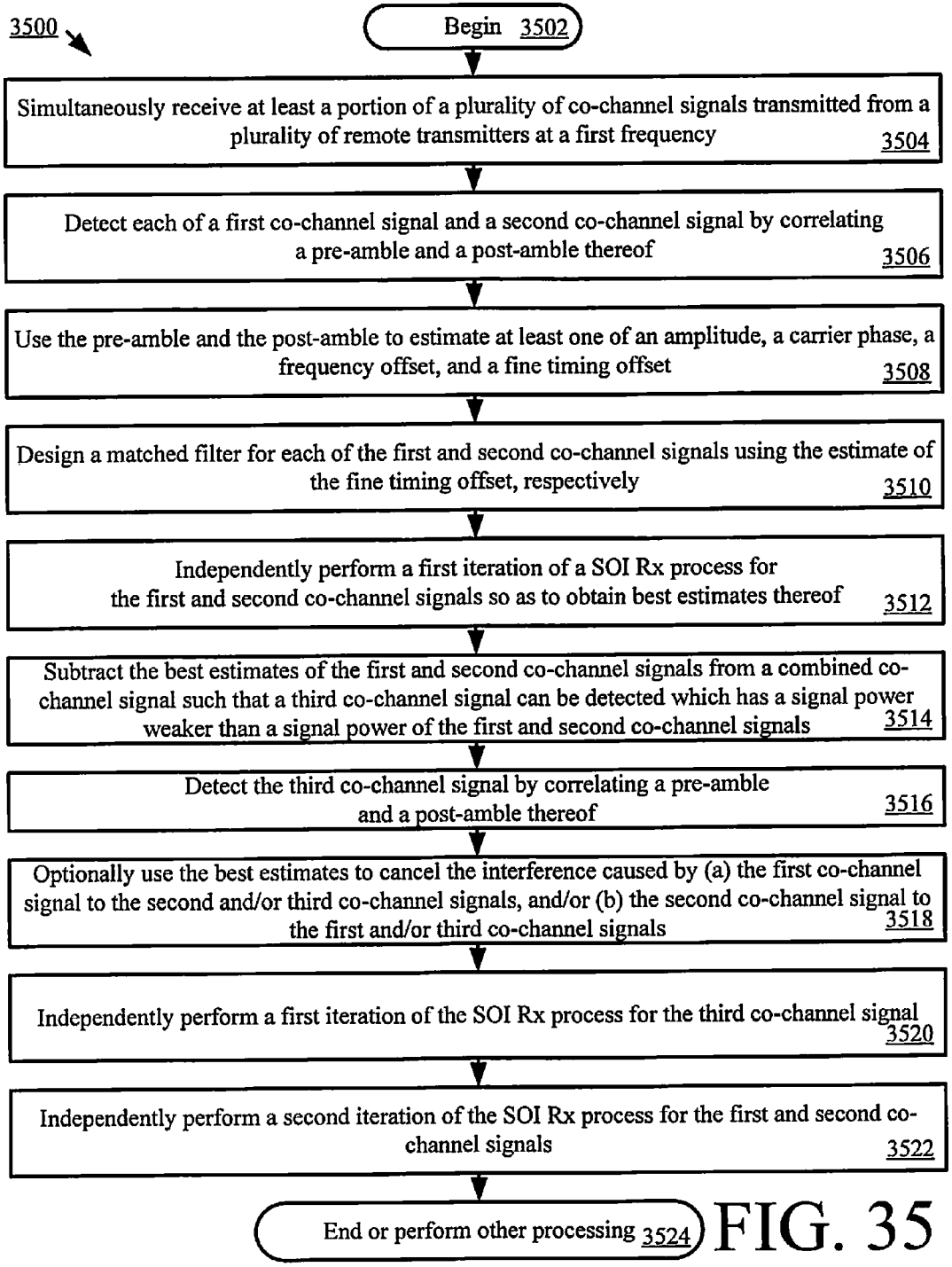
FIG. 35 provides a flow diagram of an exemplary method for receive processing of a burst communication system where a plurality of co-channels signals collide in a receiver.

Referring now to FIG. 35, there is provided a flow diagram of an exemplary method 3500 for receive processing of a burst communication system where a plurality of co-channels signals collide in a receiver. The method 3500 begins with step 3502 and continues with step 3504. In step 3504, at least a portion of a plurality of co-channel signals are simultaneously received. The co-channel signals include signals transmitted from a plurality of remote transmitters at a first frequency. Next, in step 3506, for example with N=2 users or co-channel signals, each of a first and second co-channel signal is detected by correlating a pre-amble and a post-amble thereof. The pre-amble and post-amble are then used in step 3508 to estimate an amplitude, a carrier phase, a frequency offset and/or a fine timing offset. Matched filters are designed in step 3510 for the first and second co-channel signals. The matched filters are each designed using the respective fine timing offset.

Upon completing step 3510, step 3512 is performed where a first iteration of a Turbo MUD process is independently performed for the first and second co-channel signals. As a result of performing the Turbo MUD processes, best estimates for the first and second co-channel signals are obtained. In the next step 3514 for the illustrative example, the best estimates are subtracted from a combined co-channel signal such that a third co-channel signal can be detected which has a signal power weaker than a signal power of the first and second co-channel signals. Thereafter, the third co-channel signal is detected by correlating a pre-amble and a post-amble thereof, as shown by step 3516.

Subsequent to detecting the third co-channel signal, an optional step 3518 is performed. In step 3518, the best estimates are used to cancel interference caused by (a) the first co-channel signal to the second and/or third co-channel signals, and/or (b) the second co-channel signal to the first and/or third co-channel signals. Next, a first iteration of the Turbo MUD process is performed for the third co-channel signal, as shown by step 3520. Also, a second iteration of the Turbo MUD process is performed for the first and second co-channel signals, as shown by step 3522. Thereafter, step 3524 is performed where the method 3500 ends or other processing is performed.

Figure 36:
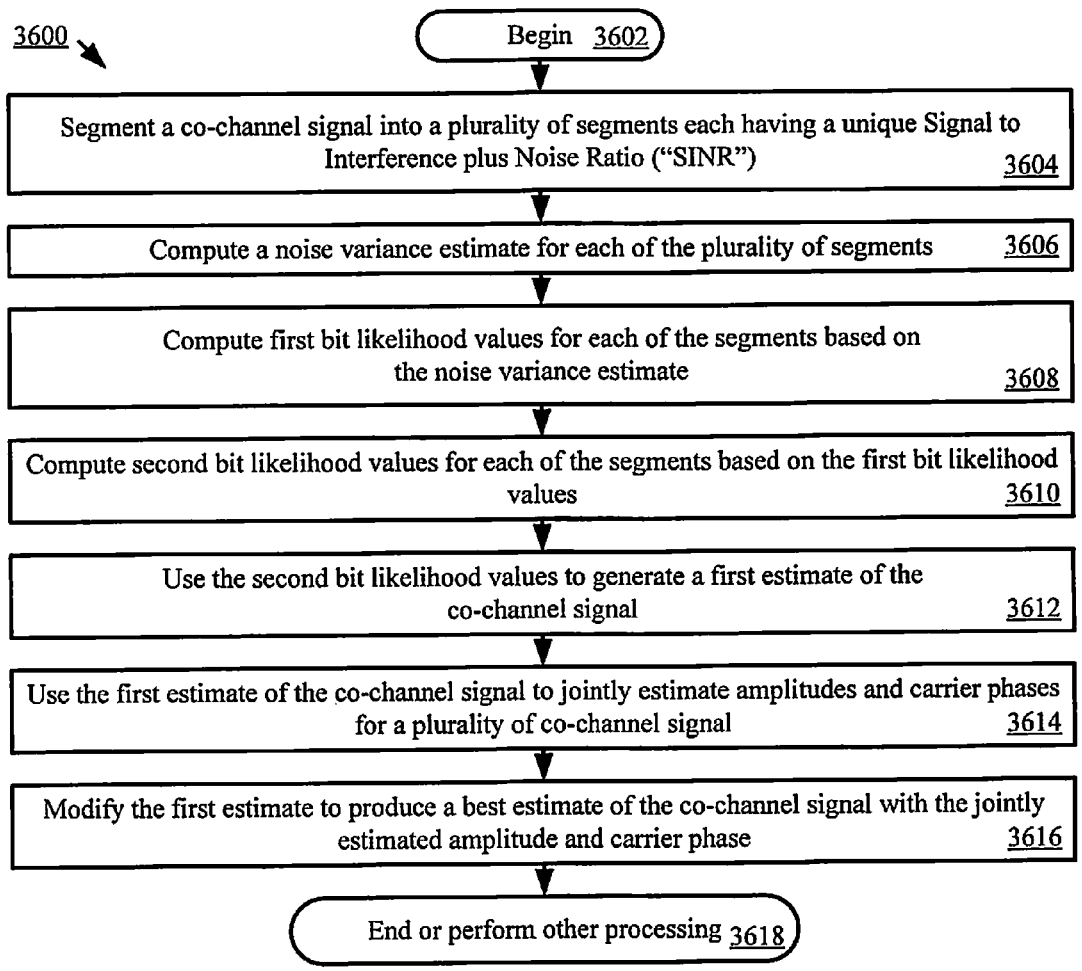
FIG. 36 provides a flow diagram of an exemplary Turbo MUD process.

Referring now to FIG. 36, there is provided a flow diagram of an exemplary Turbo MUD process 3600. The Turbo MUD process 3600 begins with step 3602 and continues with step 3604. In step 3604, a co-channel signal is segmented into a plurality of segments. Each segment has a unique SINR. Next in step 3606, a noise power or variance estimate is computed for each segment. The noise power or variances are then used in step 3608 to compute first bit likelihood values for the segments, respectively. Second bit likelihood values for each segment are computed in step 3610 using the first bit likelihood values (i.e., soft-in soft-out). The second bit likelihood values are used to generate a first estimate of the co-channel signal, as shown by step 3612. The first estimate is then used in step 3614 to jointly estimate amplitudes and carrier phases for a plurality of co-channel signals, inclusive of the co-channel signal. The first estimate is modified in step 3616 to produce a best estimate of the co-channel signal with the jointly estimated amplitude and carrier phase. Thereafter, step 3618 is performed where the method 3600 ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for receive processing of a burst communication system where a plurality of co-channels signals collide in a receiver, comprising:
   simultaneously receiving at least a portion of the plurality of co-channel signals transmitted from a plurality of remote transmitters at a first frequency; and
   independently performing a first iteration of a Turbo MUD process for a first co-channel signal and a second co-channel signal of the plurality of co-channel signals, said Turbo MUD process comprising
      segmenting each of the first and second co-channel signals into a plurality of segments each having a unique Signal to Interference plus Noise Ratio,
      computing a noise variance estimate for each of the plurality of segments, computing first bit likelihood values for each of the segments based on the noise variance estimate,
      computing second bit likelihood values for each of the segments based on the first bit likelihood values, and
      using the second bit likelihood values to generate a first estimate of the first and second co-channel signals.

2. The method according to claim 1, wherein the Turbo MUD process further comprises detecting each of the first co-channel signal and the second co-channel signal by correlating a pre-amble and a post-amble thereof.

3. The method according to claim 2, wherein the Turbo MUD process further comprises using the pre-amble and post-amble of each first and second co-channel signal to estimate at least one of an amplitude, a carrier phase, a frequency offset, and a fine timing offset.

4. The method according to claim 3, wherein the Turbo MUD process further comprises designing a matched filter for each of the first and second co-channel signals using the estimates of the fine timing offset, respectively.

5. The method according to claim 1, wherein each of the first and second co-channel signals is segmented by:
   detecting start times and stop times of the first and second co-channel signals; and
   using the start times and stop times to determine overlap conditions of the first and second co-channel signals.

6. The method according to claim 1, wherein the Turbo MUD process further comprises subtracting best estimates of the first and second co-channel signals from a combined co-channel signal such that a third co-channel signal can be detected which has a signal power weaker than a signal power of the first and second co-channel signals.

7. The method according to claim 6, further comprising independently Turbo MUD processing the third co-channel signal.

8. The method according to claim 1, further comprising cancelling interference caused by the second co-channel signal to the first co-channel signal prior to a second iteration of the Turbo MUD process for the first co-channel signal.

9. The method according to claim 1, wherein the first estimate is a soft signal estimate without gain and carrier phase adjustments.

10. The method according to claim 1, further comprising using the first estimate to jointly estimate an amplitude and a carrier phase of the first and second co-channel signals.

11. The method according to claim 10, further comprising modifying the first estimate to produce a second estimate with the jointly estimated amplitude and carrier phase.

12. The method according to claim 11, further comprising using the second estimate in a subsequent iteration of the Turbo MUD process for interference cancellation and amble correlation.

13. The method according to claim 10, wherein the gain and carrier phase are jointly estimated for the first and second co-channel signals using Least Squares Estimation.

14. The method according to claim 13, wherein the Least Squares Estimation is performed by solving the following mathematical equation $$c = R^{-1}d$$

where c represents a matrix of complex constants each specifying the gain and carrier phase for a respective one of the first and second co-channel signals, $R^{-1}$ represents an inverse correlation matrix of a plurality of users, d represents a product of multiplying a vector including samples stored in a buffer and a conjugate transpose of a matrix comprising reconstructed samples output from the Turbo MUD process for the first and second co-channel signals.

15. A system, comprising:
  a receiving device comprising
    a front end circuit configured to simultaneously receive at least a portion of a plurality of co-channel signals transmitted from a plurality of remote transmitters at a first frequency, and
    a Turbo MUD processing circuit configured to independently perform a first iteration of a Turbo MUD process for a first co-channel signal and a second co-channel signal of the plurality of co-channel signals, said Turbo MUD process comprising
      segmenting each of the first and second co-channel signals into a plurality of segments each having a unique Signal to Interference plus Noise Ratio,
      computing a noise variance estimate for each of the plurality of segments,
      computing first bit likelihood values for each of the segments based on the noise variance estimate,
      computing second bit likelihood values for each of the segments based on the first bit likelihood values, and
      using the second bit likelihood values to generate a first estimate of the first and second co-channel signals.

16. The system according to claim 15, wherein the Turbo MUD process further comprises detecting each of the first co-channel signal and the second co-channel signal by correlating a pre-amble and a post-amble thereof.

17. The system according to claim 16, wherein the Turbo MUD process further comprises using the pre-amble and post-amble of each first and second co-channel signal to estimate at least one of an amplitude, a carrier phase, a frequency offset, and a fine timing offset.

18. The system according to claim 17, wherein the Turbo MUD process further comprises designing a matched filter for each of the first and second co-channel signals using the estimates of the fine timing offset, respectively.

19. The system according to claim 15, wherein each of the first and second co-channel signals is segmented by:
  detecting start times and stop times of the first and second co-channel signals; and
  using the start times and stop times to determine overlap conditions of the first and second co-channel signals.

20. The system according to claim 15, wherein the Turbo MUD process further comprises subtracting best estimates of the first and second co-channel signals from a combined co-channel signal such that a third co-channel signal can be detected which has a signal power weaker than a signal power of the first and second co-channel signals.

21. The system according to claim 20, wherein the Turbo MUD processing circuit is further configured to independently Turbo MUD process the third co-channel signal.

22. The system according to claim 15, wherein the Turbo MUD processing circuit is further configured to cancel interference caused by the second co-channel signal to the first co-channel signal prior to a second iteration of the Turbo MUD process for the first co-channel signal.

23. The system according to claim 15, wherein the first estimate is a soft signal estimate without gain and carrier phase adjustments.

24. The system according to claim 15, wherein the Turbo MUD processing circuit is further configured to use the first estimate to jointly estimate an amplitude and a carrier phase of the first and second co-channel signals.

25. The system according to claim 24, wherein the Turbo MUD processing circuit is further configured to modify the first estimate to produce a second estimate with the jointly estimated amplitude and carrier phase.

26. The system according to claim 25, further comprising using the second estimate in a subsequent iteration of the Turbo MUD process for interference cancellation and amble correlation.

27. The system according to claim 24, wherein the gain and carrier phase are jointly estimated for the first and second co-channel signals using Least Squares Estimation.

28. The system according to claim 27, wherein the Least Squares Estimation is defined by the following mathematical equation $$c = W^{-1}d$$

where c represents a matrix of complex constants each specifying the gain and carrier phase for a respective one of the first and second co-channel signals, $R^{-1}$ represents a correlation matrix of a plurality of users, d represents a product of multiplying a vector including samples stored in a buffer and a conjugate transpose of a matrix comprising reconstructed samples output from the Turbo MUD process for the first and second co-channel signals.

29. A method for receive processing of a burst communication system where a plurality of co-channels signals collide in a receiver, comprising:
  simultaneously receiving at least a portion of the plurality of co-channel signals transmitted from a plurality of remote transmitters at a first frequency; and
  independently performing a first iteration of a Turbo MUD process for a first co-channel signal of the plurality of co-channel signals, said Turbo MUD process comprising
    segmenting the first co-channel signal into a plurality of segments each having a unique Signal to Interference plus Noise Ratio, computing a noise variance estimate for each of the plurality of segments, computing first bit likelihood values for each of the segments based on the noise variance estimate,
computing second bit likelihood values for each of the segments based on the first bit likelihood values, and
using the second bit likelihood values to generate a first estimate of the first co-channel signal.

* * * * *